United States Patent [19]

Matsubara

[11] Patent Number: 5,355,319
[45] Date of Patent: Oct. 11, 1994

[54] PATTERN DATA PROCESSING APPARATUS FOR SEWING MACHINE

[75] Inventor: Kenji Matsubara, Nagoya, Japan

[73] Assignee: Brother Kogyo Kabushiki Kaisha, Nagoya, Japan

[21] Appl. No.: 888,533

[22] Filed: May 26, 1992

[30] Foreign Application Priority Data

Aug. 22, 1991 [JP] Japan .................. 3-237089

[51] Int. Cl.$^5$ .................. G06F 15/46; D05B 21/00
[52] U.S. Cl. .................. 364/470; 112/121.12; 112/458
[58] Field of Search .................. 364/470, 191; 112/121.11, 121.12, 453, 454, 458

[56] References Cited

U.S. PATENT DOCUMENTS

| | | | |
|---|---|---|---|
| 4,391,212 | 7/1983 | Tamiya et al. | 112/456 |
| 4,413,574 | 11/1983 | Hirota et al. | 112/458 |
| 4,417,531 | 11/1983 | Doyama | 112/458 |
| 4,502,402 | 3/1985 | Kato | 112/456 |
| 4,522,137 | 6/1985 | Takenoya et al. | 112/266.1 |
| 4,602,583 | 7/1986 | Hanyu | 112/458 |
| 4,742,786 | 5/1988 | Hashimoto et al. | 112/121.12 |
| 4,834,007 | 5/1989 | Miyazaki et al. | 364/470 |
| 5,016,550 | 5/1991 | Horie et al. | 112/454 |
| 5,074,232 | 12/1991 | Matsubara et al. | 112/445 |
| 5,097,779 | 3/1992 | Ishikawa et al. | 112/445 |

*Primary Examiner*—Paul Gordon
*Attorney, Agent, or Firm*—Oliff & Berridge

[57] ABSTRACT

For each of a plurality of frame patterns, pattern data of the frame pattern, position data of character patterns and data of a maximum number of character patterns are stored in a memory. When an arbitrary one of the frame patterns and a plurality of arbitrary character patterns are selected, data composition is performed such that the selected character patterns are combined with the frame pattern at a predetermined position on the condition that the number of such character patterns is limited to the maximum number for the selected frame pattern.

19 Claims, 36 Drawing Sheets

Fig.3B

| ITEM | INSTRUCTIONS |
|---|---|
| A1 | START ADDRESS OF PATTERN DATA OF FRAME PATTERN CODE W1 |
| A2 | START ADDRESS OF PATTERN DATA OF FRAME PATTERN CODE Wi |
| A3 | START ADDRESS OF PATTERN DATA OF FIGURE PATTERN CODE G1 |
| A4 | START ADDRESS OF PATTERN DATA OF FIGURE PATTERN CODE Gi |
| A5 | START ADDRESS OF PATTERN DATA OF CHARACTER PATTERN CODE M1 |
| A6 | START ADDRESS OF PATTERN DATA OF CHARACTER PATTERN CODE Mi |
| D1 | PATTERN DATA OF FRAME PATTERN CODE W1 |
| D2 | PATTERN DATA OF FRAME PATTERN CODE Wi |
| D3 | PATTERN DATA OF FIGURE PATTERN CODE G1 |
| D4 | PATTERN DATA OF FIGURE PATTERN CODE Gi |
| D5 | PATTERN DATA OF CHARACTER PATTERN CODE M1 |
| D6 | PATTERN DATA OF CHARACTER PATTERN CODE Mi |
| D7 | PATTERN GROUP ARRANGEMENT DATA OF FRAME PATTERN CODE W1 |
| D8 | PATTERN GROUP ARRANGEMENT DATA OF FRAME PATTERN CODE Wi |
| N1 | MAXIMUM CHARACTER NUMBERS OF FIRST AND SECOND LINES OF FRAME PATTERN CODE W1 |
| N2 | MAXIMUM CHARACTER NUMBERS OF FIRST AND SECOND LINES OF FRAME PATTERN CODE Wi |
| C1 | CHARACTER LINE DIRECTION (VERTICAL OR HORIZONTAL) OF FRAME PATTERN CODE W1 |
| C2 | CHARACTER LINE DIRECTION (VERTICAL OR HORIZONTAL) OF FRAME PATTERN CODE Wi |

Fig.6

| BIT | CONTENTS OF SET MODE |
|---|---|
| 7 | FRAME PATTERN OR NOT          ( "1" OR "0" ) |
| 6 | SEWING TO BE STOPPED OR NOT ( "1" OR "0" ) |
| 5 | PRESENCE OR ABSENCE OF LEFT UPPER NEEDLE LOCATION OF PATTERN GROUP ( "1" OR "0" ) |
| 4 | PRESENCE OR ABSENCE OF RIGHT UPPER NEEDLE LOCATION OF PATTERN GROUP ( "1" OR "0" ) |
| 3 | X CO-ORDINATE VALUE OF REFERENCE POSITION OF PATTERN GROUP |
| 2 | ( "01" OR "10" OR "11") |
| 1 | Y CO-ORDINATE VALUE OF REFERENCE POSITION OF PATTERN GROUP |
| 0 | ( "01" OR "10" OR "11") |

Fig.30B

| ITEM | INSTRUCTIONS |
|---|---|
| S160 | BP←A0<br>GC←0<br>MC←0 |
| S161 | 5BF←XI & YI DESIGNATED BY GC |
| S162 | READ DATA OF 1BF |
| S163 | PATTERN CODE? |
| S164 | AP←START ADDRESS OF PATTERN DATA |
| S165 | READ PATTERN SIZE DATA |
| S166 | TB←0 |
| S167 | READ STITCH DATA |
| S168 | ENDING DATA? |
| S169 | 5BF←STITCH DATA |
| S170 | TB←(TB+STITCH DATA)<br>AP←(AP+α) |
| S171 | EQUAL TO MC? |
| S172 | ED←(E-TB) |
| S173 | 5BF←ED |
| S174 | 5BF←FF |
| S175 | GC←(GC+1) |
| S176 | 5BF←XI & YI DESIGNATED BY GC |
| S177 | BP←(BP+1)<br>MC←(MC+1) |
| S178 | HORIZONTAL DIRECTION? |
| S179 | ED←(PRU-TB) |
| S180 | 5BF←ED |
| S181 | ED←(PLD-TB) |
| S182 | 5BF←ED |
| S183 | 5BF←FF |

Fig.31B

| ITEM | INSTRUCTIONS |
|---|---|
| D21 | X- & Y-DIRECTION SHIFT AMOUNT DATA (XI0,YI0) |
| D22 | FIRST STITCH DATA OF FIGURE PATTERN $(x_{01}, y_{01})$ |
| D23 | SECOND STITCH DATA OF FIGURE PATTERN $(x_{02}, y_{02})$ |
| D24 | nTH STITCH DATA OF FIGURE PATTERN $(x_{0n}, y_{0n})$ |
| D25 | END POINT DATA (ED) |
| D26 | PATTERN GROUP ENDING DATA (FF) |
| D27 | X- & Y-DIRECTION SHIFT AMOUNT DATA (XI1,YI1) |
| D28 | FIRST STITCH DATA OF FRAME PATTERN $(x_{11}, y_{11})$ |
| D29 | SECOND STITCH DATA OF FRAME PATTERN $(x_{12}, y_{12})$ |
| D30 | nTH STITCH DATA OF FRAME PATTERN $(x_{1n}, y_{1n})$ |
| D31 | END POINT DATA (ED) |
| D32 | PATTERN GROUP ENDING DATA (FF) |
| D33 | X- & Y-DIRECTION SHIFT AMOUNT DATA (XI2,YI2) |
| D34 | FIRST STITCH DATA OF FIRST CHARACTER PATTERN $(x_{21}, y_{21})$ |
| D35 | SECOND STITCH DATA OF FIRST CHARACTER PATTERN $(x_{22}, y_{22})$ |
| D36 | nTH STITCH DATA OF FIRST CHARACTER PATTERN $(x_{2n}, y_{2n})$ |
| D37 | END POINT DATA (ED) |
| D38 | FIRST STITCH DATA OF SECOND CHARACTER PATTERN $(x_{31}, y_{31})$ |
| D39 | SECOND STITCH DATA OF SECOND CHARACTER PATTERN $(x_{32}, y_{32})$ |
| D40 | nTH STITCH DATA OF SECOND CHARACTER PATTERN $(x_{3n}, y_{3n})$ |
| D41 | END POINT DATA (ED) |

Fig.32B

| ITEM | INSTRUCTIONS |
|---|---|
| D51 | FIRST STITCH DATA OF nTH CHARACTER PATTERN $(x_{(n1)1}, y_{(n1)1})$ |
| D52 | SECOND STITCH DATA OF nTH CHARACTER PATTERN $(x_{(n1)2}, y_{(n1)2})$ |
| D53 | nTH STITCH DATA OF nTH CHARACTER PATTERN $(x_{(n1)n}, y_{(n1)n})$ |
| D54 | END POINT DATA (ED) |
| D55 | PATTERN GROUP ENDING DATA (FF) |
| D56 | X- & Y-DIRECTION SHIFT AMOUNT DATA (XI3, YI3) |
| D57 | FIRST STITCH DATA OF FIRST CHARACTER PATTERN $(x_{(n1+1)1}, y_{(n1+1)1})$ |
| D58 | SECOND STITCH DATA OF FIRST CHARACTER PATTERN $(x_{(n1+1)2}, y_{(n1+1)2})$ |
| D59 | nTH STITCH DATA OF FIRST CHARACTER PATTERN $(x_{(n1+1)n}, y_{(n1+1)n})$ |
| D60 | END POINT DATA (ED) |
| D61 | FIRST STITCH DATA OF SECOND CHARACTER PATTERN $(x_{(n1+2)1}, y_{(n1+2)1})$ |
| D62 | SECOND STITCH DATA OF SECOND CHARACTER PATTERN $(x_{(n1+2)2}, y_{(n1+2)2})$ |
| D63 | nTH STITCH DATA OF SECOND CHARACTER PATTERN $(x_{(n1+2)n}, y_{(n1+2)n})$ |
| D64 | END POINT DATA (ED) |
| D65 | FIRST STITCH DATA OF nTH CHARACTER PATTERN $(x_{(n2)1}, y_{(n2)1})$ |
| D66 | SECOND STITCH DATA OF nTH CHARACTER PATTERN $(x_{(n2)2}, y_{(n2)2})$ |
| D67 | nTH STITCH DATA OF nTH CHARACTER PATTERN $(x_{(n2)n}, y_{(n2)n})$ |
| D68 | END POINT DATA (ED) |
| D69 | PATTERN GROUP ENDING DATA (FF) |

PATTERN DATA PROCESSING APPARATUS FOR SEWING MACHINE

BACKGROUND OF THE INVENTION

1. Field of the Invention

This invention relates to a pattern data processing apparatus for a sewing machine. More particularly, the invention relates to a pattern data processing apparatus for a sewing machine wherein arrangement positions of a plurality of character patterns and an allowable maximum character number of character patterns are set in advance for each of a plurality of frame patterns in order to produce composite pattern data in accordance with a composite pattern, including a frame pattern and a plurality of character patterns in combination, which can be sewn with an attractive appearance.

2. Description of the Related Art

Conventionally, electronic zigzag sewing machines are commonly known which have an embroidering apparatus on which sewing of patterns can be performed, including character patterns such as numerals, alphabets and kana characters, and frame patterns, such as an arcuate pattern and a rectangular pattern. Such an embroidering apparatus is removably attached in order to sew various patterns in addition to practical patterns such as straight stitches, zigzag stitches and fancy stitches.

In a sewing machine which employs such an embroidering apparatus, a plurality of pattern data (stitch data) for sewing such character patterns and frame patterns are individually stored in advance in a corresponding relationship to pattern codes in a pattern data memory inside or outside the sewing machine. Thus, pattern data of a selected pattern are read out from the pattern data memory, and unit patterns of desired character patterns and a frame pattern or patterns can be successively sewn on a work fabric which is fed by the embroidering apparatus in accordance with the pattern data thus read out.

Accordingly, when an operator wants to form a composite pattern, including a frame pattern and a plurality of character patterns in combination, on the work fabric, the frame pattern which creates a reference pattern is first selected and sewn at a desired position of the work fabric. Then, each of the plurality of character patterns is sewn at a desired position of the work fabric while moving the work fabric to form the composite pattern. A so-called name tag is thus produced with a composite pattern.

As described just above, when the composite pattern, including a frame pattern and a plurality of character patterns in combination, is to be formed by a sewing machine employing such conventional embroidering apparatus, an operator will set a sewing position for the formation of each pattern while manually moving the work fabric. Accordingly, the sewing machine employing such conventional embroidering apparatus is disadvantageous because often an arrangement position of an entire character pattern line including a plurality of character patterns is not aligned or oriented properly with respect to a frame pattern. Further, particularly when a large number of character patterns to be formed are involved, the number of character patterns which can be formed with respect to a desired frame pattern must be determined, for example, by performing test sewing of a plurality of such character patterns in advance, which complicates the sewing procedure of a composite pattern.

SUMMARY OF THE INVENTION

It is an object of the present invention to provide a pattern data processing apparatus for a sewing machine wherein arrangement positions of unit patterns with respect to a reference pattern and a maximum number of patterns can be automatically set for each reference pattern, and composite pattern data for a composite pattern having an attractive appearance can be produced readily.

In order to attain the above and other objects, the present invention provides a pattern data processing apparatus for a sewing machine for producing composite pattern data in accordance with a composite pattern, including a reference pattern and a plurality of unit patterns such as character patterns in combination, which is to be sewn. The pattern data processing apparatus comprises unit pattern data storage means for storing pattern data of a large number of unit patterns; reference data storage means for storing pattern data of a reference pattern for each of a plurality of reference patterns, arrangement position data for a plurality of unit patterns, and data of an allowable maximum number of unit patterns; pattern selecting means for selectively setting one of the reference patterns and a plurality of ones of the unit patterns to be combined with the one reference pattern; data composing means for composing composite pattern data of a composite pattern in accordance with data of the reference data storage means regarding one of the reference patterns selected by the pattern selecting means and data of the unit pattern data storage means regarding a plurality of unit patterns selected by the pattern selecting means in the condition that the number of unit patterns is limited to the maximum number for the selected reference pattern; and composite pattern data storage means for storing therein data composed by the data composing means.

In the pattern data processing apparatus for a sewing machine in accordance with the present invention, the unit pattern data storage means stores therein pattern data of a large number of unit patterns, and the reference data storage means stores therein, for each of a plurality of reference patterns, pattern data of the reference pattern, arrangement position data for a plurality of unit patterns, and data of an allowable maximum number of unit patterns. When one of the reference patterns and a plurality of the unit patterns to be combined with the one reference pattern are selectively set by the pattern selecting means, the data composing means composes composite pattern data of a composite pattern in accordance with data of the reference data storage means regarding one of the reference patterns selected by the pattern selecting means and data of the unit pattern data storage means regarding a plurality of unit patterns selected by the pattern selecting means in the condition that the number of unit patterns is limited to the maximum number for the selected reference pattern. The composite pattern data storage means stores therein data thus composed by the data composing means.

For example, if the reference pattern is a frame pattern and the unit patterns are character patterns, the plurality of character patterns are arranged at optimum positions with respect to the frame pattern on the condition that the number of such character patterns is limited to the maximum number set in advance for the selected reference pattern. If sewing is performed in accordance with the composite pattern data stored in the composite pattern data storage means, a composite pattern including a frame pattern and a plurality of character patterns can be formed with an attractive appearance.

With the pattern data processing apparatus for a sewing machine according to the present invention, composite pattern data for a composite pattern of a good appearance can be produced readily since the apparatus comprises unit pattern data storage means, reference data storage means, pattern selecting means, data composing means and composite pattern data storage means and arrangement positions of unit patterns with respect to a reference pattern and an allowable maximum number of unit patterns which are set automatically for each reference pattern.

DESCRIPTION OF THE DRAWINGS

Preferred embodiments of the present invention will be described in detail with reference to the following figures, wherein:

FIG. 3B is a chart corresponding to the diagram of FIG. 3A;

FIG. 6 is a diagrammatic representation illustrating data construction of set mode data involved in the pattern arrangement data;

FIG. 30B is a chart corresponding to the flow chart of FIG. 30A;

FIG. 31B is a chart corresponding to FIG. 31A;

FIG. 32B is a chart corresponding to FIG. 32A;

DETAILED DESCRIPTION OF THE PREFERRED EMBODIMENTS

Preferred embodiments of the present invention will be described below wherein the present invention is applied to a pattern data processing apparatus provided with an electronically controllable zigzag sewing machine to which a removable embroidering apparatus is attached.

Figure 1:
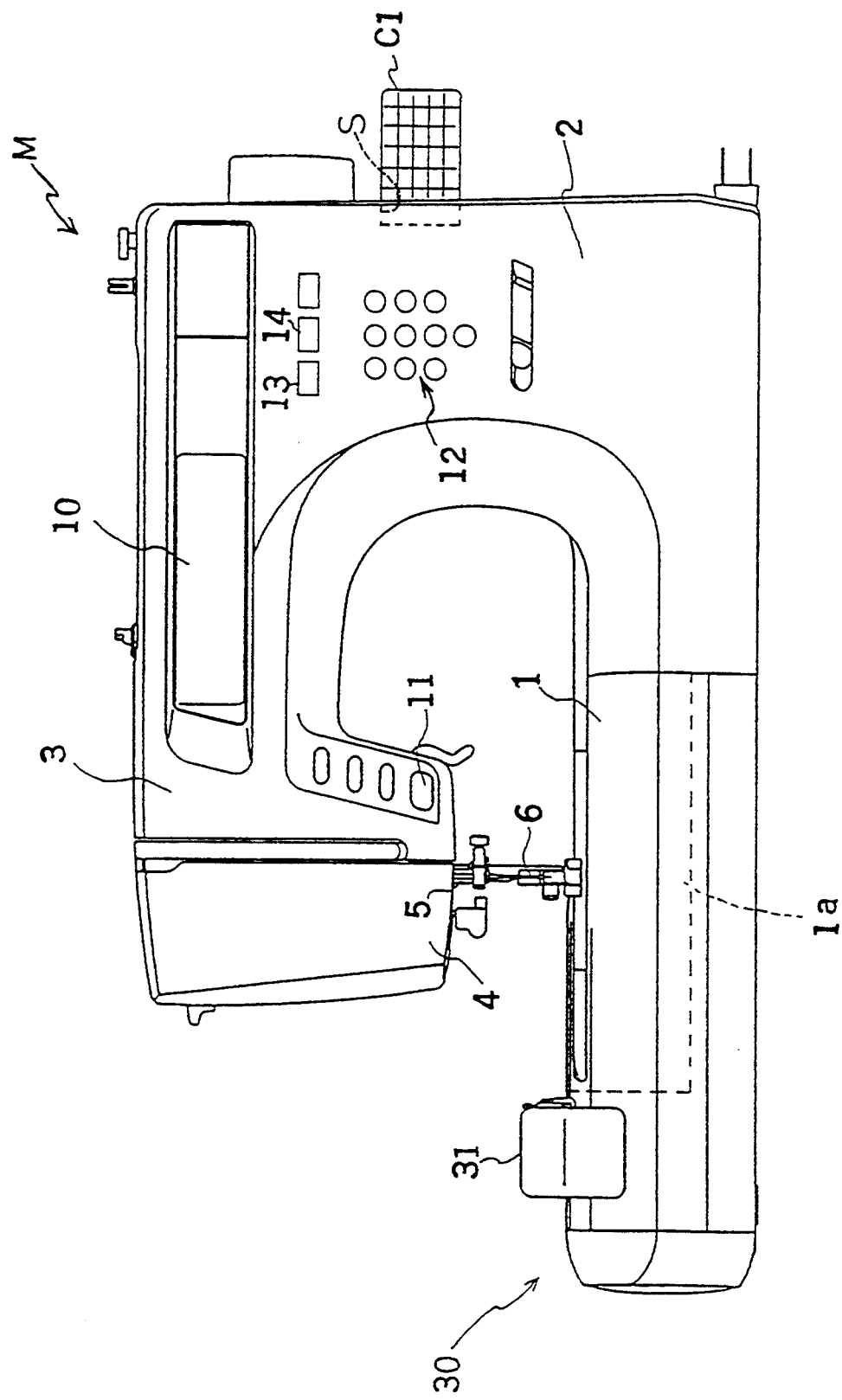
FIG. 1 is a front elevational view of an electronically controllable zigzag sewing machine to which an embroidering apparatus in accordance with the present invention is attached.

Referring first to FIG. 1, the electronically controllable zigzag sewing machine generally denoted at M includes a sewing machine bed section 1, a column section 2 extending uprightly from a right end portion of the bed section 1, and an arm section 3 extending left from the column section 2 in an opposing relationship to the bed section 1, as viewed in FIG. 1. A feed dog up and down moving mechanism (not shown) for moving a feed dog (not shown) up and down, a feed dog forward and backward moving mechanism (not shown) for moving the feed dog forward and backward, and so forth are provided on the bed section 1. A needle bar driving mechanism (not shown) for moving a needle bar 5, to a lower end of which a sewing needle 6 can be attached, upward and downward, a needle bar rocking mechanism (not shown) for rocking the needle bar 5 in a direction perpendicular to a fabric feeding direction, a thread take-up lever driving mechanism (not shown) for moving a thread take-up lever (not shown) upward and downward in a timed relationship with the needle bar 5, and so forth are provided on the arm section 3. The above-described moving mechanisms are conventional.

Figure 2:
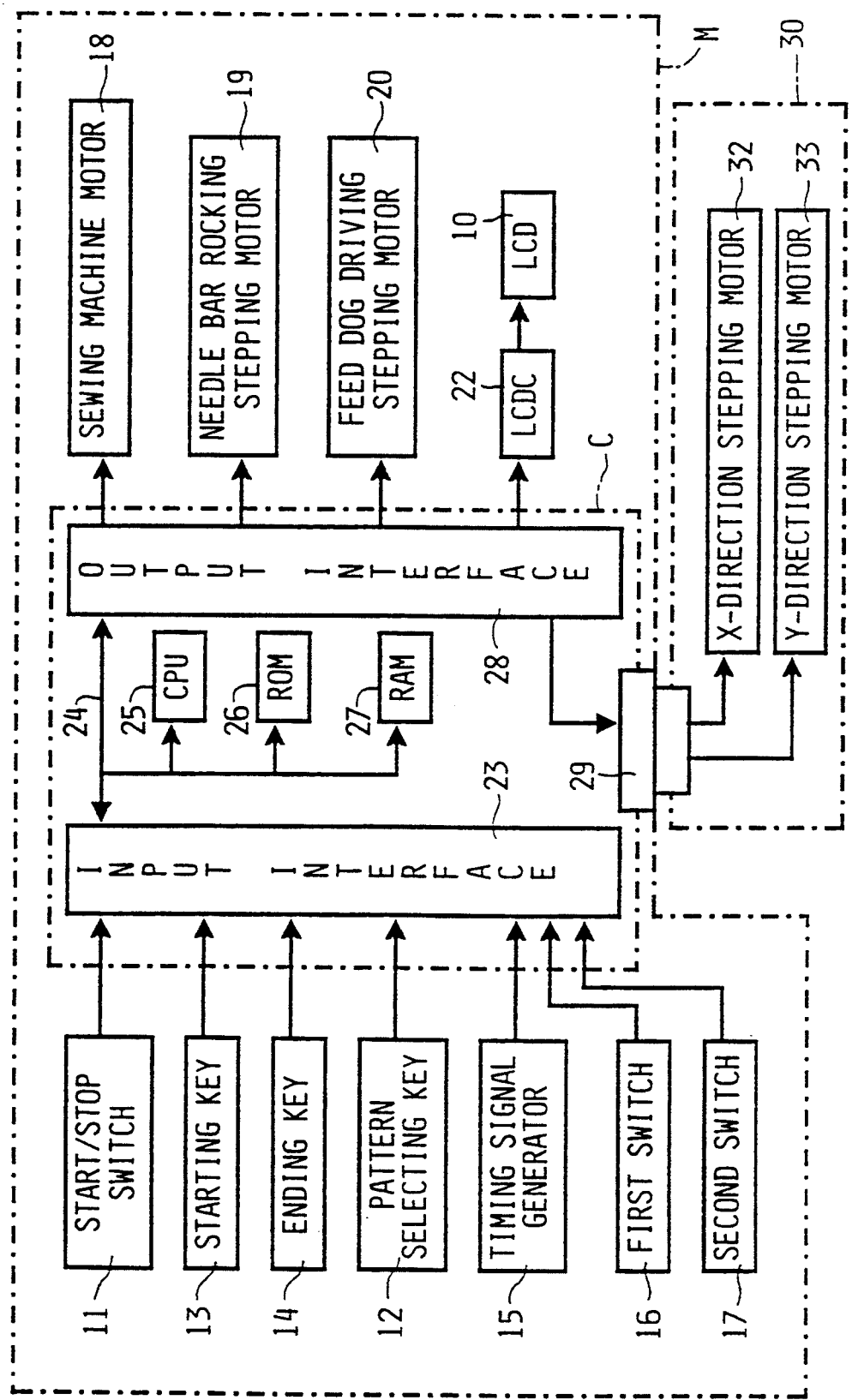
FIG. 2 is a block diagram of a controlling system for the sewing machine and the embroidering apparatus of FIG. 1.

It is to be noted that the feed dog upward and downward moving mechanism, needle bar driving mechanism and thread take-up lever driving mechanism are driven by a sewing machine motor 18 (FIG. 2) while the feed dog forward and backward moving mechanism is driven by a feed dog driving stepping motor 20 (FIG. 2), and the needle bar rocking mechanism is driven by a needle bar rocking stepping motor 19 (FIG. 2).

A liquid crystal display 10 on which various stitch patterns and/or various messages can be displayed is provided on the arm section 3 while a start/stop switch 11 for instructing starting and stopping of a sewing operation is provided on a head section 4 mounted at an end of the arm section 3. Furthermore, a plurality of pattern selecting keys 12, for example in the form of ten keys, for selecting a desired stitch pattern and a starting key 13 and an ending key 14 for starting and ending sewing of a composite pattern, which will be described later, are provided on the column section 2. A card slot S for mounting any of four different pattern selection cards C1 to C4 onto a card receiver is formed in the column section 2.

A free arm section 1a is formed at a left end portion of the bed section 1 of sewing machine M as viewed in FIG. 1 to which an embroidering apparatus 30 is removably attached. An embroidery table 31 is provided on the embroidering apparatus 30 for movement in a Y-direction, which is parallel to the fabric feeding direction and the fabric reverse feeding direction, and an X-direction, which is perpendicular to the Y-direction.

A support frame (not shown) for supporting a work fabric thereon can be removably attached to the embroidery table 31. Furthermore, an X-direction stepping motor 32 (refer to FIG. 2) for driving the embroidery table 31 in the X-direction and a y-direction stepping motor 33 (refer to FIG. 2) for driving the embroidery table 31 in the Y-direction are disposed in a body frame of the embroidery apparatus 30. Accordingly, various embroidery patterns can be formed on a work fabric on the support frame by cooperation of driving of the stepping motors 32 and 33 and upward and downward movement of the needle bar 5 responsive to driving signals supplied from the sewing machine M.

Four different practical pattern selection cards C1 to C4, as shown in FIGS. 10 to 13, are prepared in advance. Referring to FIGS. 10 to 13, a plurality of patterns of practical stitches such as straight stitches and zigzag stitches and pattern numbers are drawn in a corresponding relationship on the practical pattern selection card C1; a plurality of figure patterns including animals and vehicles and pattern numbers are drawn in a corresponding relationship on the figure pattern selection card C2; a plurality of frame patterns including curves, arcs and so forth and pattern numbers are drawn in a corresponding relationship on the frame pattern selection card C3; and a plurality of character patterns including kana characters, square form kana characters, alphabets and a small number of Chinese characters and pattern numbers are drawn in a corresponding relationship on the character pattern selection card C4. Moreover, as viewed in FIGS. 10-12 respectively, a first slit 35 is formed at a lower end portion adjacent a left end of the practical pattern selection card C1; a second slit 36 is formed at a lower end portion adjacent a right end of the figure pattern selection card C2; and a first slit 35 and a second slit 36 are formed at lower end portions adjacent to the opposite left and right ends of the frame pattern selection card C3. However, the character pattern selection card C4 is solid and has neither slit 35 nor 36 formed at the lower end portion thereof. Accordingly, in order to identify the kind of pattern selection cards C1 to C4 mounted on the card receiver, the card receiver has provided therein, as shown in FIG. 2, a first switch 16 corresponding to the first slit 35 and a second switch 17 corresponding to the second slit 36. The first or second switch 16 or 17 is selectively operated by engagement with the solid portion of the lower end portion of the pattern selection cards C1 to C4.

A controlling system for the sewing machine M and the embroidering apparatus 30 is constructed in such a manner as illustrated in the block diagram of FIG. 2.

Referring to FIG. 2, the start/stop switch 11, starting key 13, ending key 14, pattern selection keys 12 and first and second switches 16 and 17 are connected to an input interface 23 of a controlling apparatus C for the sewing machine M of the controlling system. Also, a timing signal generator 15 is connected to the input interface 23. The timing signal generator 15 is provided adjacently to a sewing machine main shaft (not shown) which is rotated by the sewing machine motor 18 and generates various timing signals, such as timing signals for a lifted needle position and a needle bobbin thread. The sewing machine motor 18, needle bar rocking stepping motor 19 and feed dog driving stepping motor 20 are connected to an output interface 28 of the controlling apparatus C. Also, a display controller (LCDC, liquid crystal display controller) 22 for a display (LCD, liquid crystal display) 21 is connected to the output interface 28. Furthermore, the X-direction stepping motor 32 and Y-direction stepping motor 33 of the embroidering apparatus 30 are connected to the output interface 28 by a pair of connectors 29.

The controlling apparatus C includes a CPU (central processing unit) 25, and the input interface 23, the output interface 28, a ROM (read only memory) 26 and a RAM (random access memory) 27, all connected to the CPU 25 by a bus 24 such as a data bus. The pattern data processing apparatus comprises the pattern selection keys 12, first and second switches 16 and 17, and controlling apparatus C.

The ROM 26 stores in advance a motor driving controlling program for driving the motors 18 to 20, a controlling program for pattern selecting control which will be hereinafter described, and a controlling program for composite pattern data producing control. The RAM 27 includes various pointers, counters and flag memories necessary for pattern selecting control and pattern data producing control, first to fifth buffers 1BF to 5BF, and various memories for temporarily storing results from calculations by the CPU 25.

Figure 3A:
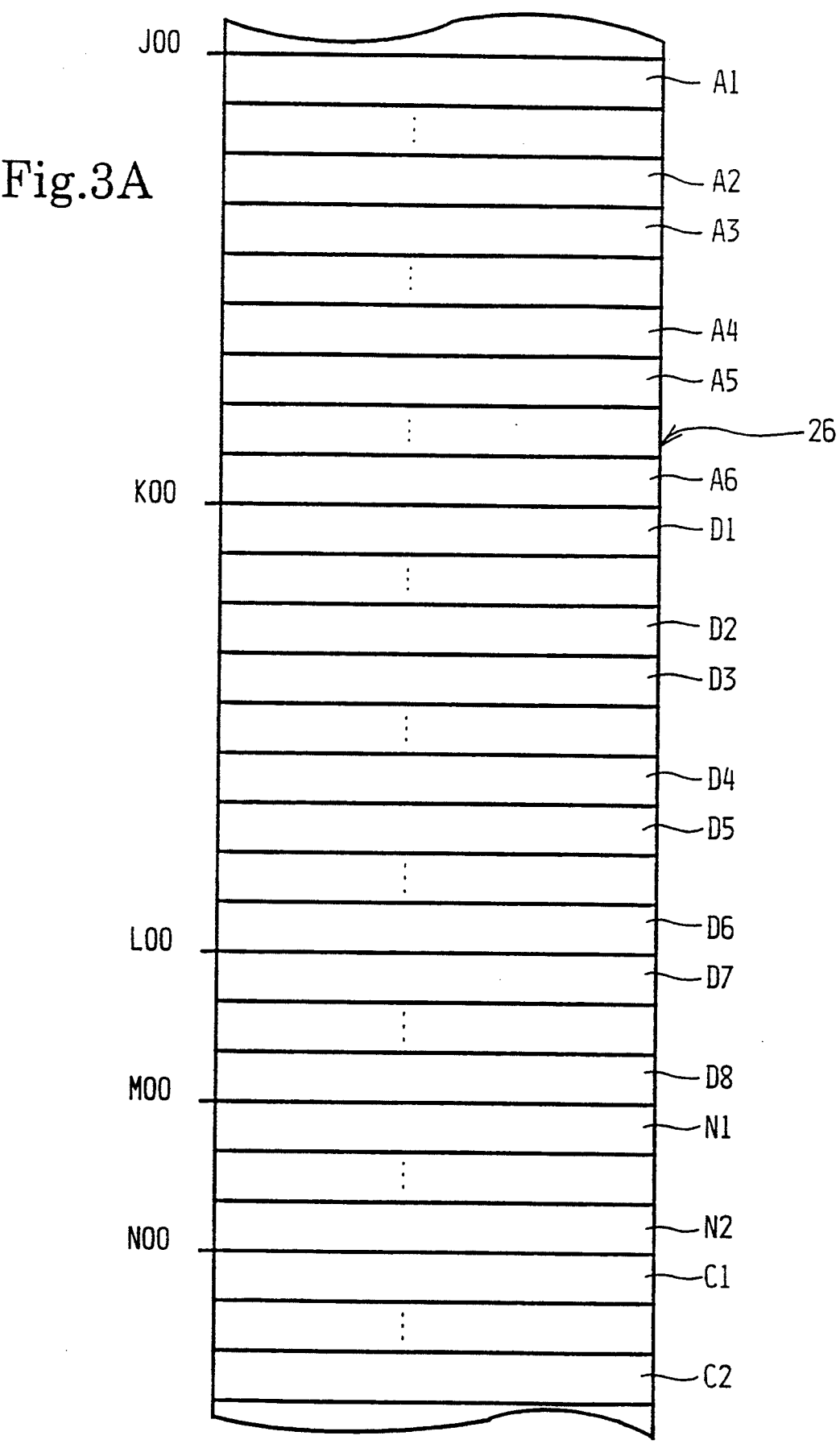
FIG. 3A is a diagrammatic representation illustrating data construction of pattern data regarding frame patterns, figure patterns and character patterns, pattern arrangement data set for the individual frame patterns and character arrangement direction data stored in a ROM in a controlling apparatus of the sewing machine of FIG. 1.

Referring to FIGS. 3A and 3B, the ROM 26 further stores in advance start addresses of pattern data of a plurality of frame pattern codes W1 to Wi, start addresses of pattern data of a plurality of figure pattern codes G1 to Gi and start addresses of pattern data of a plurality of character pattern codes M1 to Mi, at addresses beginning with the address "J00"; pattern data of the frame pattern codes W1 to Wi, pattern data of the figure pattern codes G1 to Gi and pattern data of the character pattern codes M1 to Mi, at addresses beginning with the address "K00"; arrangement data of figure patterns and pattern groups of character patterns to be sewn in connection with the frame patterns of the frame pattern codes W1 to Wi, at addresses beginning with the address "L00"; maximum character numbers (M1N, M2N) of first line character pattern arrangement positions (hereinafter referred to as "first line arrangement positions") and second line character pattern arrangement positions (hereinafter referred to as "second line arrangement positions") of character patterns to be sewn in connection with the frame patterns of the frame pattern codes W1 to Wi, at addresses beginning with the address "M00"; and direction data (vertical direction or horizontal direction) of directions of arrangement of character patterns to be sewn in connection with the frame patterns of the frame pattern codes W1 to Wi, at addresses beginning with the address "N00".

Figure 4:
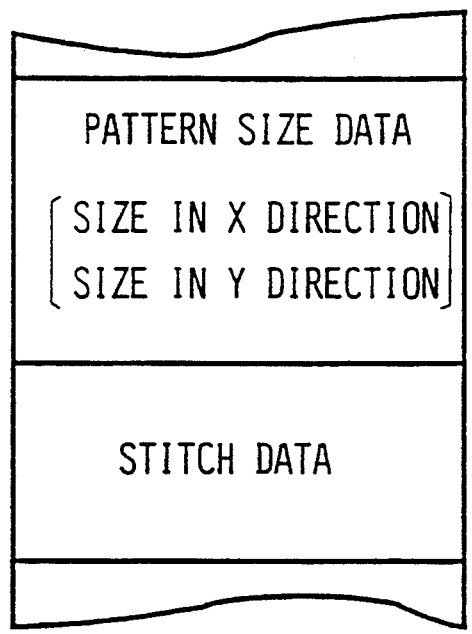
FIG. 4 is a diagrammatic representation partially illustrating data construction of pattern data stored in the ROM.
Figure 5:
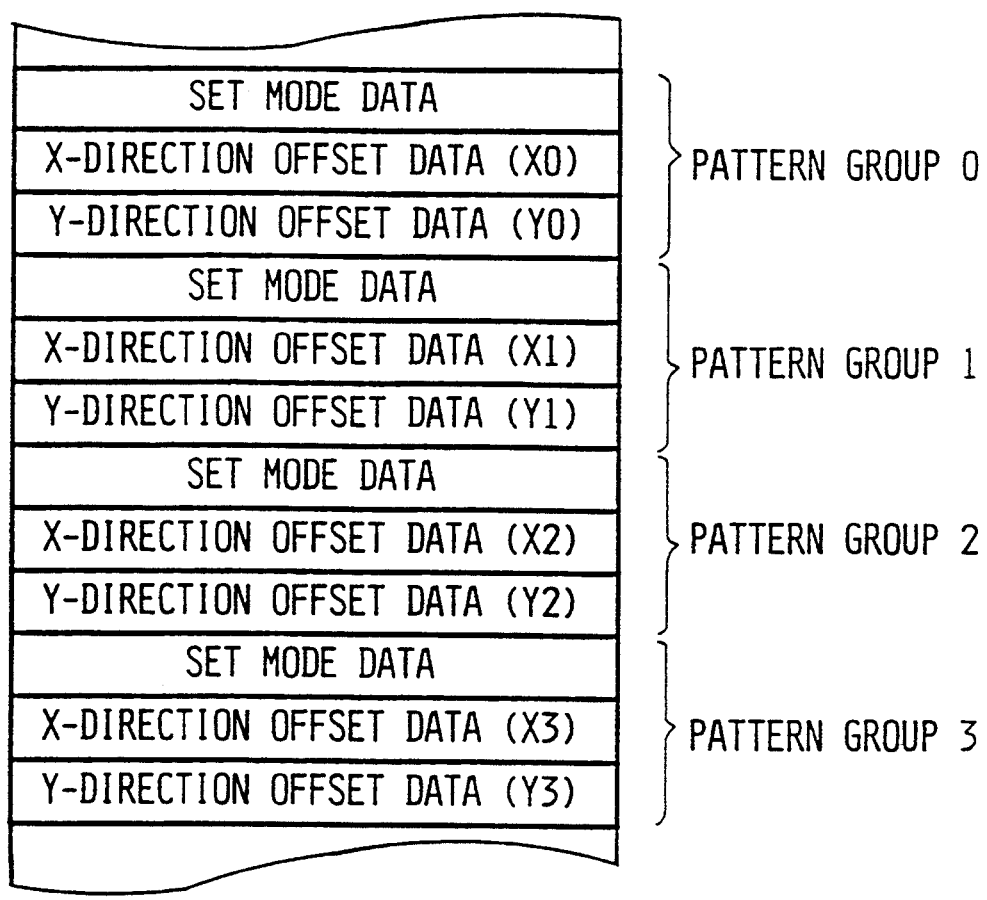
FIG. 5 is a diagrammatic representation partially illustrating data construction of pattern arrangement data stored in the ROM.

Each of the pattern data of the frame patterns, figure patterns and character patterns consists of, as illustrated in FIG. 4, pattern size data representative of sizes in the X- and Y-directions and compressed stitch data consisting of a plurality of X-coordinates and Y-coordinates. Each of the arrangement data of the patterns of the frame pattern codes W1 to Wn stored at addresses beginning with the address "L00" consists of, as shown in FIG. 5, set mode data, X-direction offset data (X0) and Y-direction offset data (Y0) regarding a pattern group 0, set mode data, X-direction offset data (X1) and Y-direction offset data (Y1) regarding a pattern group 1, set mode data, X-direction offset data (X2) and Y-direction offset data (Y2) regarding a pattern group 2, and set mode data, X-direction offset data (X3) and Y-direction offset data (Y2) regarding a pattern group 3. It is to be noted that Y1=0 and X1=0. Here, an offset amount consisting of X-direction offset data and Y-direction offset data set for each of the pattern groups 0 to 3 is an amount of displacement of the position of the center of an outer profile of a figure pattern G or the position of the center of an outer profile of a first or second line arrangement position from the position of the center of a maximum profile of a frame pattern W. The pattern group 0 denotes a figure pattern G; the pattern group 1 denotes a frame pattern W; the pattern group 2 denotes a plurality of character patterns M at the first line arrangement position; and the pattern group 3 denotes a plurality of character patterns M at the second line arrangement position.

Figure 8:
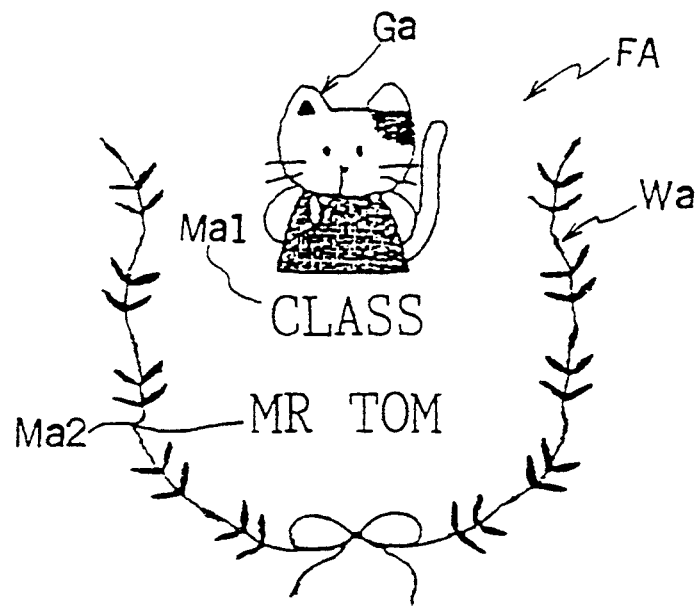
FIG. 8 is an illustration showing a sample sewn composite pattern formed from a frame pattern, a figure pattern and a plurality of character patterns arranged in horizontal rows.

For example, in the case of a composite pattern FA shown in FIG. 8 which includes a frame pattern Wa, a figure pattern Ga is formed at a predetermined position inside the frame pattern Wa, and a plurality of character patterns Ma1 "CLASS" are formed in a horizontal row at a predetermined first line arrangement position inside the frame pattern Wa while another plurality of character patterns Ma2 "MR. TOM" are formed in a horizontal row at another predetermined second line arrangement position inside the frame pattern Wa. In the case of another composite pattern FB shown in FIG. 9 which includes another frame pattern Wb, a figure pattern Gb is formed at a predetermined position above the frame pattern Wb, and a plurality of character patterns Mb1 "BLUE" are formed in a vertical column at a predetermined first line arrangement position inside the frame pattern Wb while another plurality of character patterns Mb2 "SHINICHI" are formed in a vertical column at another predetermined second line arrangement position inside the frame pattern Wb.

Figure 7:
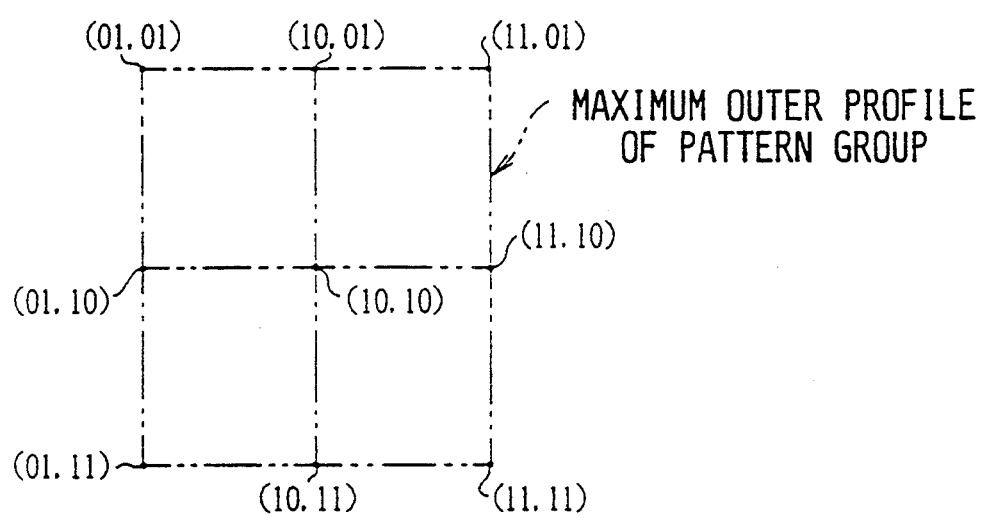
FIG. 7 is a diagram illustrating a reference position involved in the set mode data.

The set mode data are each constituted of 1 byte as shown in FIG. 6. The presence or absence of a needle location at a left upper position of a pattern group at the bit "5" and presence or absence of a needle location at a right upper position of a pattern group at the bit "4" each represent data for setting a first needle location when the pattern group (row or column of characters) is to be sewn. If a needle location is present at both of the left and right upper positions, a needle location is taken in order of the right upper position and the left upper position. Meanwhile, as illustrated in FIG. 7, an X-coordinate value ((01: leftward packing), (10: horizontal centering) or (11: rightward packing)) of a reference position of a pattern group at the bits "3" and "2" and a Y-coordinate value ((01: upward packing), (10: vertical centering) or (11: downward packing)) of a reference position of a pattern group at the bits "1" and "0" are data representing a reference position in an X-coordinate value and a Y-coordinate value when the location of a maximum profile of a pattern group is arranged with respect to the position of the center of an outer profile of a frame pattern W.

A routine for pattern selecting control executed by the pattern data processing apparatus of the sewing machine M is described with reference to the flow charts of FIGS. 14 to 19. It is to be noted that reference characters Si (i=10, 11, 12 . . . ) in those figures denote steps.

Figure 14:
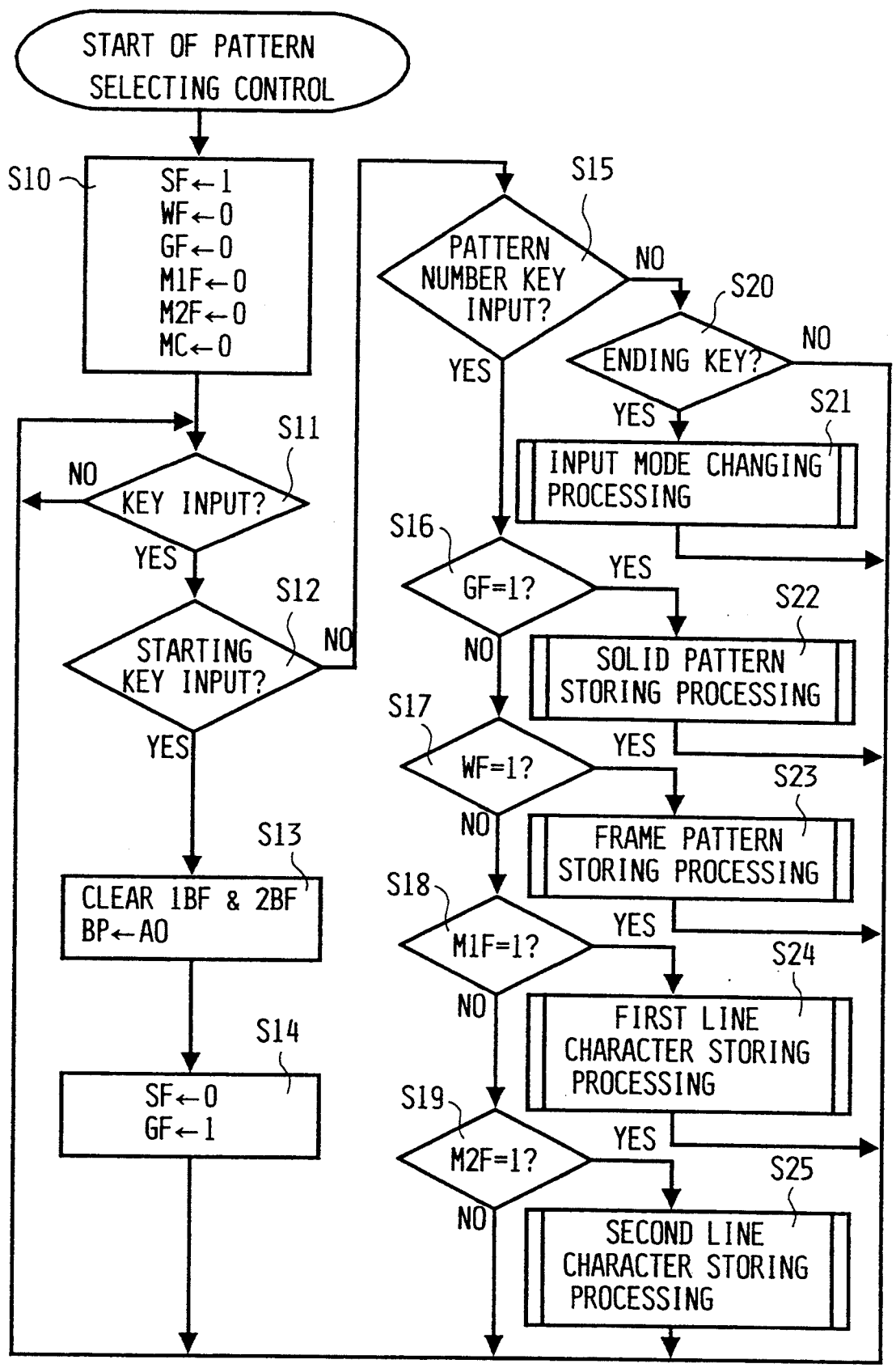
FIG. 14 is a flow chart of a routine of pattern selecting control in accordance with the present invention.

Referring first to FIG. 14, when the power is supplied to the sewing machine M, the control is started, and first, an ending mode flag SF is set; a frame mode flag WF for storing a frame pattern W, a figure mode flag GF for storing a figure pattern G, a first line character mode flag M1F for storing character patterns M for a first line arrangement position and a second line character mode flag M2F for storing character patterns M for a second line arrangement position are reset; and a pattern number count value MC of a pattern number buffer is cleared (S10). Then, when the starting key 13 is operated (S11 and S12: Yes), the first buffer 1BF and second buffer 2BF of the RAM 27 are cleared and a start address A0 of the first buffer 1BF is stored into a buffer pointer BP which indicates an address of the first buffer 1BF (S13). Then, the flag SF is reset and the flag GF is set (S14), and the control sequence returns to step S11.

Figure 15:
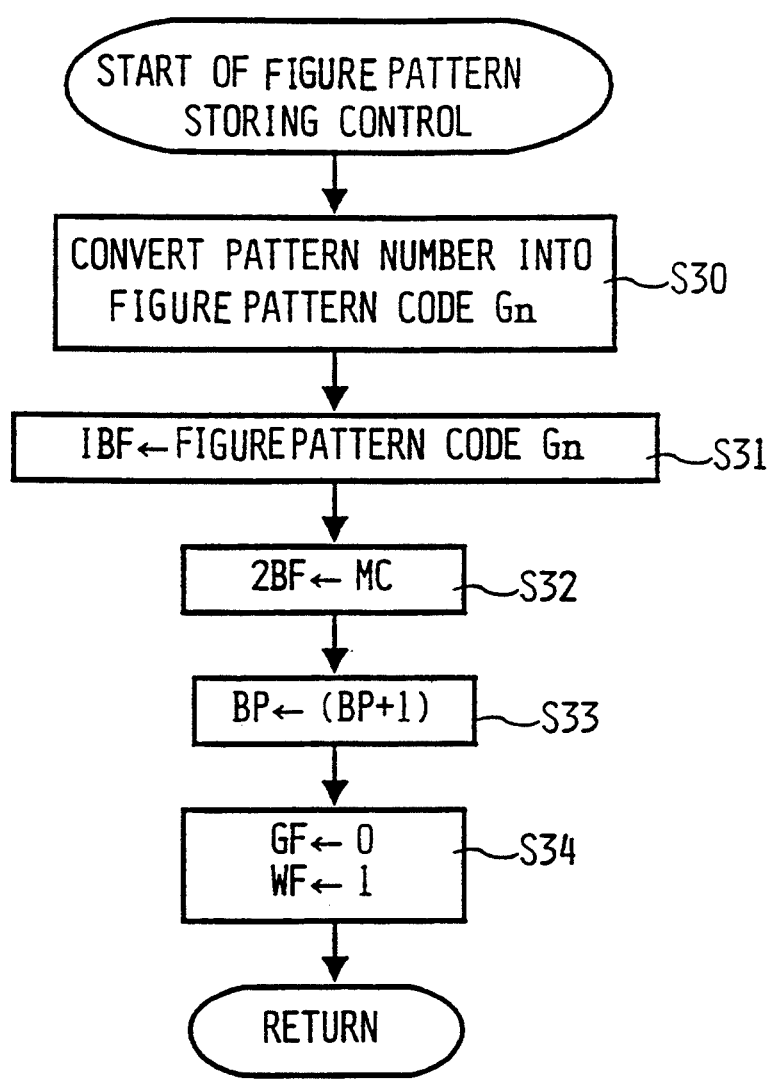
FIG. 15 is a flow chart of a routine of figure pattern storing control in accordance with the present invention.

When the pattern selecting keys 12 are selectively operated after the figure pattern selection card C2 is mounted onto the card receiver described above (S11: Yes, S12: No, S15: Yes) in order to select a figure pattern G, since the flag GF is in a set state (S16: Yes), figure pattern storing control (FIG. 15) is executed (S22). Referring to FIG. 15, after the control is started, the pattern number of the figure pattern G inputted with two figures is first converted into a figure pattern code Gn in accordance with input signals from the first and second switches 16 and 17 (S30), and the figure pattern code Gn is stored into the first buffer 1BF (S31).

Subsequently, the pattern number count value MC (MC=0) is stored into the second buffer 2BF (S32), and then, the buffer pointer BP is incremented by one (S33), before the flag GF is reset and the flag WF is set (S34), thereby completing the present control and returning the control sequence to the original routine.

Figure 16:
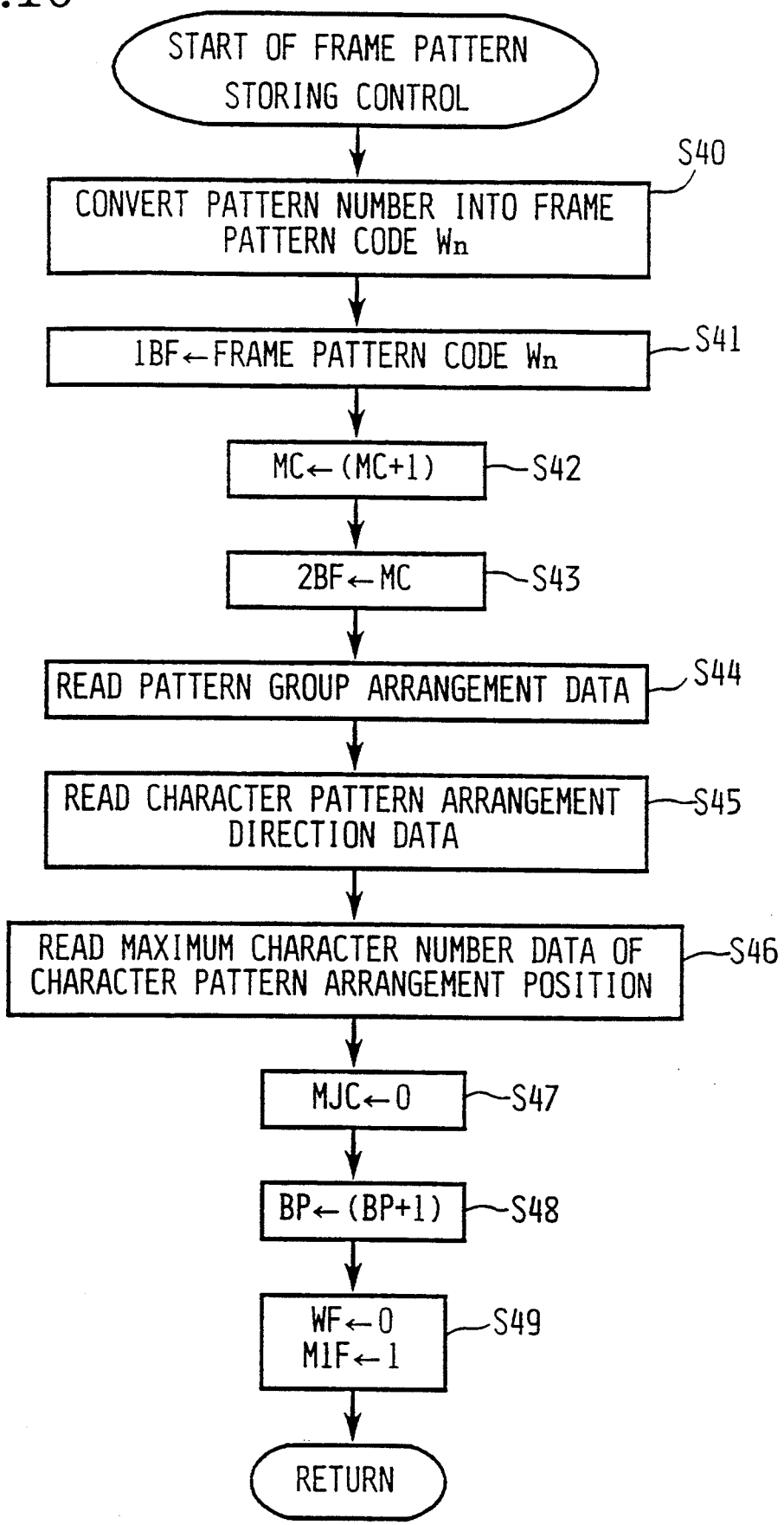
FIG. 16 is a flow chart of a routine of frame pattern storing control in accordance with the present invention.

Referring back to FIG. 14, in case the pattern selecting keys are selectively operated after the frame pattern selection card C3 is mounted onto the card receiver (S11: Yes, S12: No, S15: Yes) in order to select a frame pattern W, since the flag WF is in a set state (S16: No, S17: Yes), frame pattern storing control (FIG. 16) is executed (S23). Referring to FIG. 16, after the control is started, the pattern number of the frame pattern W inputted with two figures is first converted into a frame pattern code Wn in accordance with input signals from the first and second switches 16 and 17 (S40), and the frame pattern code Wn is stored into the first buffer 1BF (S41). Subsequently, the pattern number count value MC is incremented by one (S42), and the new pattern number count value MC (MC=1) is stored into the second buffer 2BF (S43). Then, pattern group arrangement data of the frame pattern code Wn are read in from the ROM 26 (S44), and further, arrangement direction data of character patterns to be formed in connection with the frame pattern code Wn and maximum character number data (M1N and M2N) of first and second line character pattern arrangement positions are read in (S45, S46). Then, the character number count value MJC of a character number counter is cleared (S47), and the buffer pointer BP is incremented by one (S48), before the flag WF is reset and the flag M1F is set (S49), thereby completing the present control and returning the control sequence to the original routine.

Figure 17:
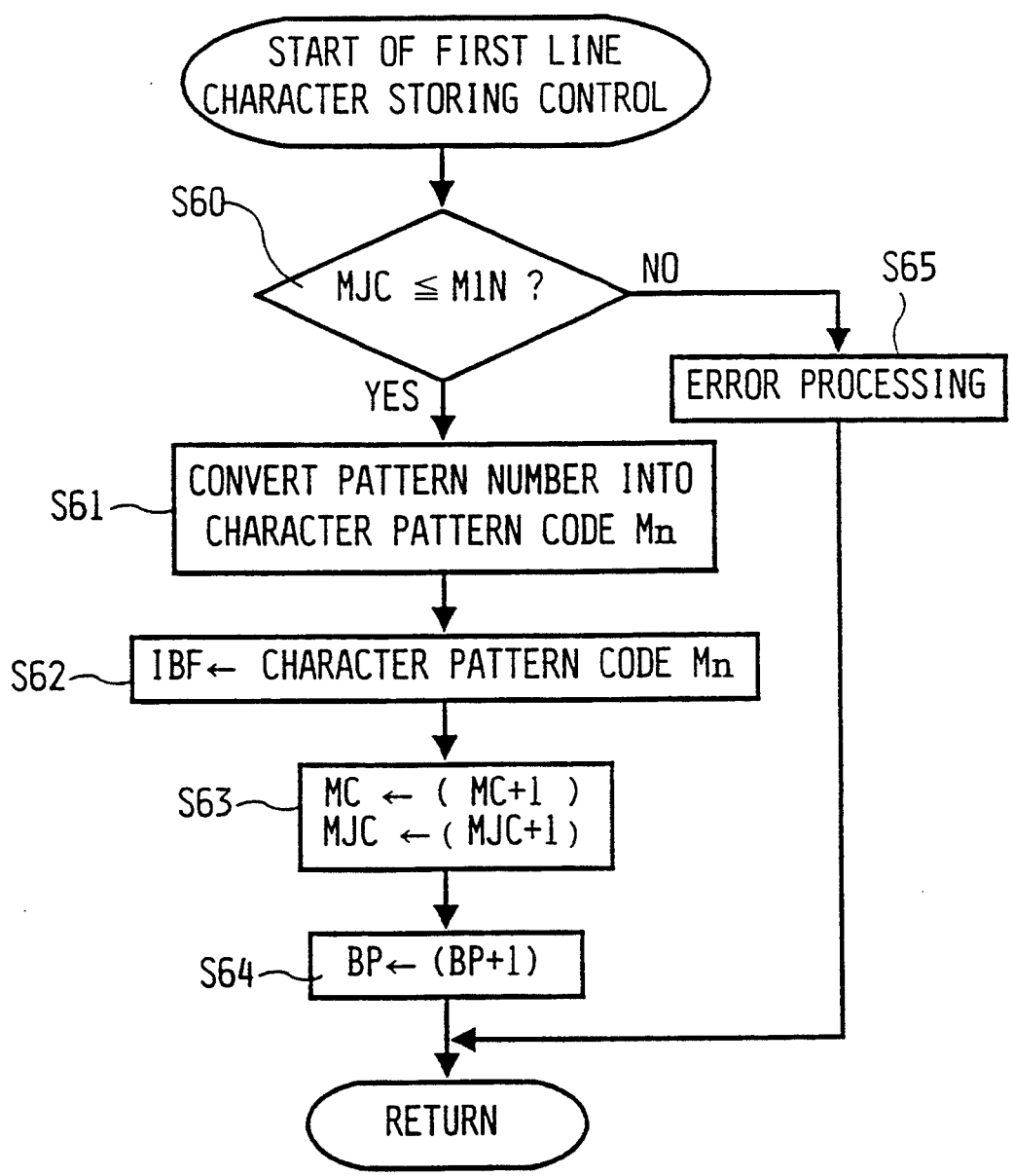
FIG. 17 is a flow chart of a routine of first line character storing control.

Referring back to FIG. 14, when the pattern selecting keys 12 are selectively operated after the character pattern selection card C4 is mounted onto the card receiver (S11: Yes, S12: No, S15: Yes) in order to select a character pattern M to be formed at the first line arrangement position, since the flag M1F is in a set state (S16, S17: No, S18: Yes), first line character storing control (FIG. 17) is executed (S24). Referring now to FIG. 17, after the control is started, when the character number count value MJC is equal to or smaller than the maximum character number data M1N for the first line arrangement position (S60: Yes), the pattern number of the character pattern M inputted with two figures is first converted into a character pattern code Mn in accordance with input signals from the first and second switches 16 and 17 (S61), and the character pattern code Mn is stored into the first buffer 1BF (S62). Subsequently, the pattern number count value MC is incremented by one and the character number count value MJC is incremented by one (S63), and also the buffer pointer BP is incremented by one (S64), thereby completing the control and returning the control sequence to the original routine. By the way, when a plurality of character patterns M are selected, each time a character pattern M is selected, the present control is executed. As a result, character pattern codes of such selected character patterns M are successively stored into the first buffer 1BF. It is to be noted that, when the character number count value MJC is greater than the maximum character number data M1N (S60: No), error processing such as displaying of a warning message on the display 10 is executed (S65).

Figure 19:
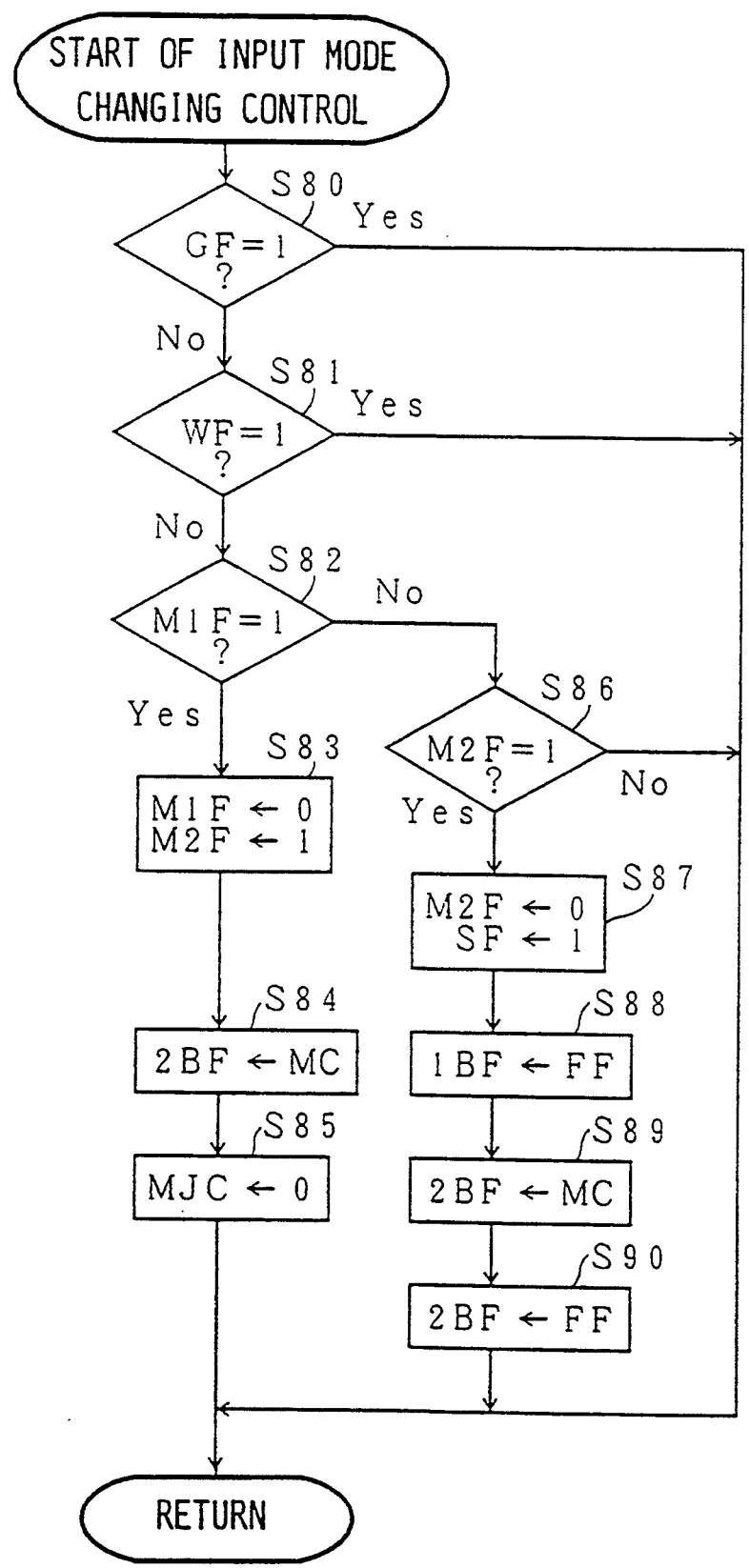
FIG. 19 is a flow chart of a routine of input mode changing control.

Referring back to FIG. 14, when the ending key 14 is operated (S11: Yes, S12, S15: No, S20: Yes), input mode changing control (FIG. 19) is executed (S21). Referring to FIG. 19, after the control is started, since the flag M1F is in a set state (S80, S81: No, S82: Yes), the flag M1F is reset and another flag M2F is set (S83). Then, the pattern number count value MC (for example, n1) is stored into the second buffer 2BF (S84), and the character number count value MJC is cleared (S85), thereby completing the present control and returning the control sequence to the original routine. It is to be noted that when the ending key 14 is operated and either the flag GF is in a set state (S80: Yes) or the flag WF is in a set state (S89: No, S81: Yes), the present control is completed immediately.

Figure 18:
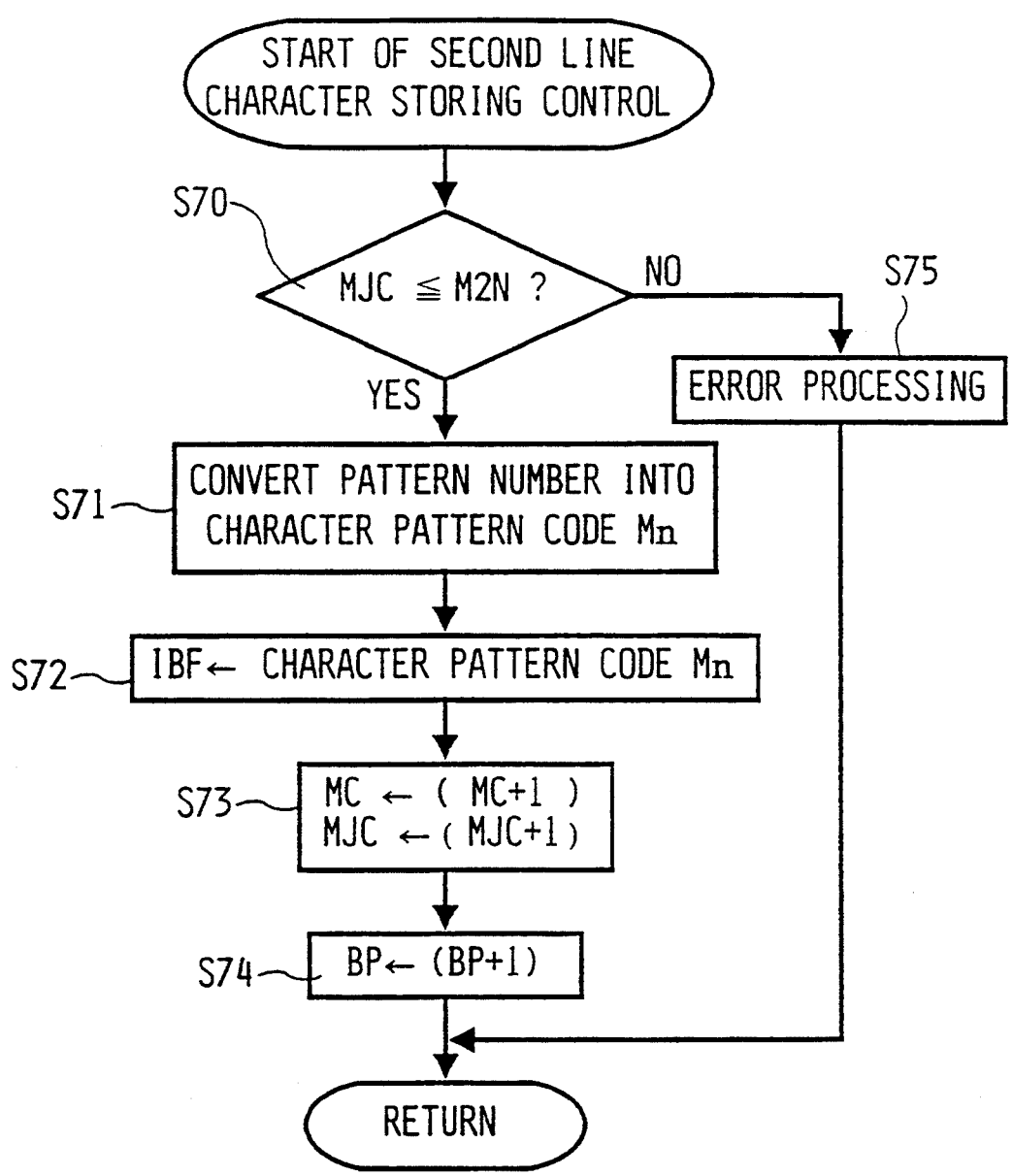
FIG. 18 is a flow chart of a routine of second line character storing control.

Referring back to FIG. 14, when the pattern selecting keys 12 are selectively operated (S11: Yes, S12: No, S15: Yes) in order to select a character pattern M to be formed at the second line arrangement position, since the flag M2F is in a set state (S16, S17, S18: No, S19: Yes), second line character storing control (FIG. 18) is executed (S25). Referring to FIG. 18, after the control is started, when the character number count value MJC is equal to or smaller than the maximum character number data M2N for the second line arrangement position (S70: Yes), the pattern number of the character pattern inputted with two figures is first converted into a character pattern code Mn in accordance with input signals from the first and second switches 16 and 17 (S71), and the character pattern code Mn is stored into the first buffer 1BF (S72). Subsequently, the pattern number count value MC is incremented by one and the character number count value MJC is incremented by one (S73), and also the buffer pointer BP is incremented by one (S74), thereby completing the control and returning the control sequence to the original routine. It is to be noted that, when the character number count value MJC is greater than the maximum character number data M2N (S70: No), error processing such as displaying of a warning message on the display 10 is executed (S75).

Referring back to FIG. 14, when the ending key 14 is operated subsequently (S11: Yes, S12, S15: No, S20: Yes), input mode changing control (FIG. 19) is executed again (S21). Referring to FIG. 19, after the control is started, since the flag M2F is in a set state (S80, S81, S82: No, S86: Yes), the flag M2F is reset and the flag SF is set (S87). Then, end data "FF" are stored into the first buffer 1BF (S88), and the character number count value MC (for example, n2) is stored into the second buffer 2BF (S89), before the end data "FF" are stored into a succeeding portion of the second buffer 2BF (S90).

Figure 20:
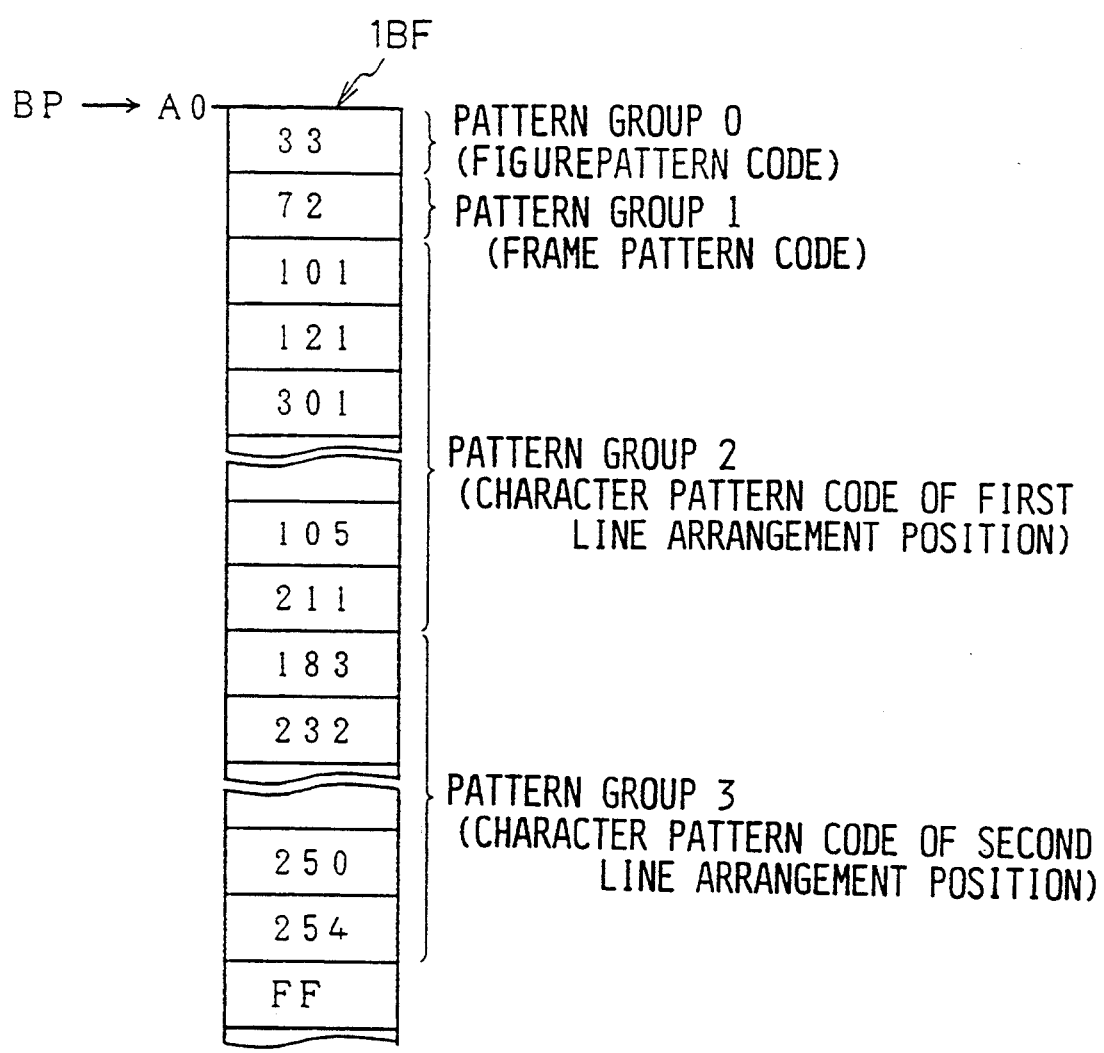
FIG. 20 is a diagrammatic representation illustrating data construction of data stored in a first buffer.
Figure 21:
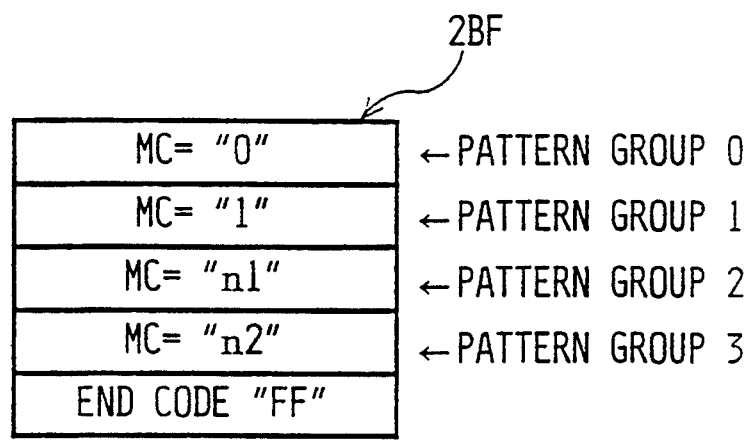
FIG. 21 is a diagrammatic representation similar to FIG. 20 but illustrating data construction of data stored in a second buffer.

Consequently, as shown, for example, in FIG. 20, one figure pattern code "33" corresponding to the pattern group 0, one frame pattern code "72" corresponding to the pattern group 1, character pattern codes "101", "121", . . . , "211" of a plurality of character patterns M to be formed at the first line arrangement position corresponding to the pattern group 2, character pattern codes "183", "232", . . . , "254" of a plurality of character patterns to be formed at the second line arrangement position corresponding to the pattern group 3, and the end code "FF", are successively stored in the first buffer 1BF. Mean-while, pattern number count values MC "0", "1", "n1" and "n2" are stored for the individual pattern groups in the second buffer 2BF as shown in FIG. 21. It is to be noted that the end data "FF" are added to the thus stored pattern number count values.

Subsequently, a routine of composite pattern data producing control which is started in response to completion of the pattern selecting control and produces composite pattern data of a composite pattern including the thus selected frame pattern W, figure pattern G and character patterns M in combination will be described with reference to the flow chart of FIG. 22.

Here, the control will first be described briefly with reference to FIGS. 33 to 38. It is assumed here that an outer profile WA of a frame pattern W, an outer profile GA of a figure pattern G, an outer profile M1A of a first line arrangement position and an outer profile M2A of a second line arrangement position are each formed into a rectangle.

Figure 33:
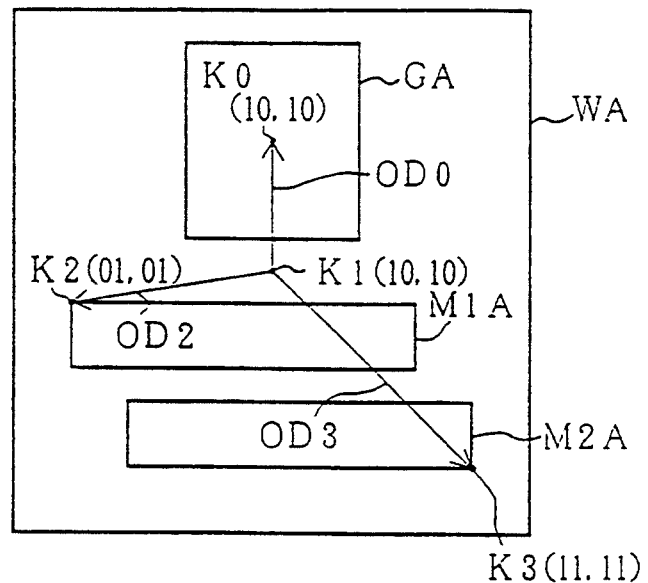
FIG. 33 is a diagram illustrating arrangement positions of an outer profile of a set figure pattern, an outer profile of an arrangement position of set character patterns of a first line and an outer profile of an arrangement position of a set character patterns of a second line with respect to an outer profile of a frame pattern.

Referring first to FIG. 33, a reference position K0 of the figure pattern outer profile GA is set, for example, to the center in the leftward and rightward direction and the center in the vertical direction (10, 10) of the figure pattern outer profile GA. Thus, the figure pattern outer profile GA is disposed such that the position of the center thereof coincides with the reference position K0 which is spaced by an offset amount OD0 (refer to offset data X0, Y0 of the pattern group 1 of FIG. 5) from a reference position (central position) K1 of the frame pattern outer profile WA. Meanwhile, a reference position K2 of the first line arrangement position outer profile M1A is set, for example, to a left upper corner (01, 01), and thus, the first line arrangement position outer profile M1A is disposed such that the left upper corner thereof coincides with the reference position K2 which is spaced by an offset amount OD2 (refer to offset data X2, Y2 of the pattern group 2 of FIG. 5) from the reference position K1 of the frame pattern outer profile WA. Similarly, since a reference position K3 of the second line arrangement position outer profile M2A is set, for example, to a right lower corner (11, 11), the second line arrangement position outer profile M2A is disposed such that the right lower corner thereof coincides with the reference position K3 which is spaced by an offset amount OD3 (refer to X3, Y3 of the pattern group 3 of FIG. 5) from the reference position K1.

Figure 34:
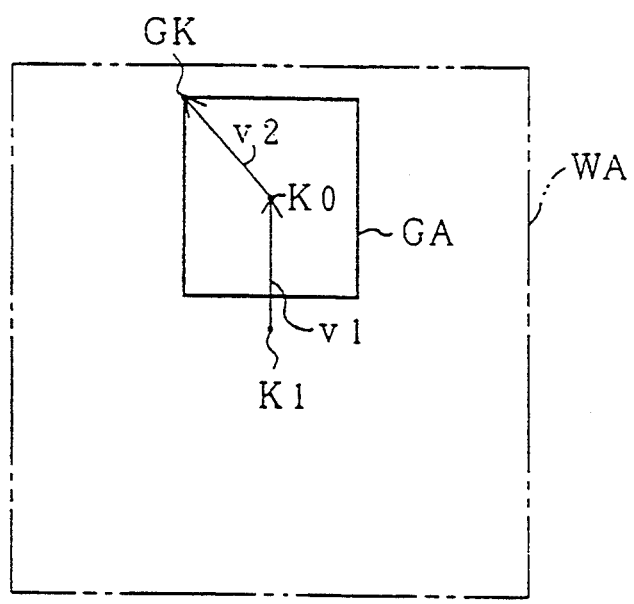
FIG. 34 is a similar view but illustrating a manner of calculating a shift amount from a reference position of the outer profile of the frame pattern to a reference position of the outer profile of the figure pattern.
Figure 35:
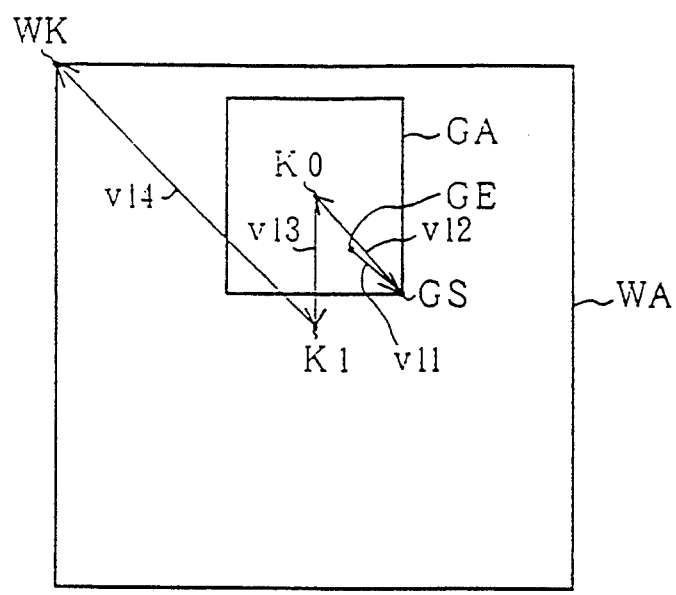
FIG. 35 is a similar view as FIG. 34 but illustrating a manner of calculating a shift amount from the reference position of the outer profile of the figure pattern to the reference position of the outer profile of the frame pattern.
Figure 36:
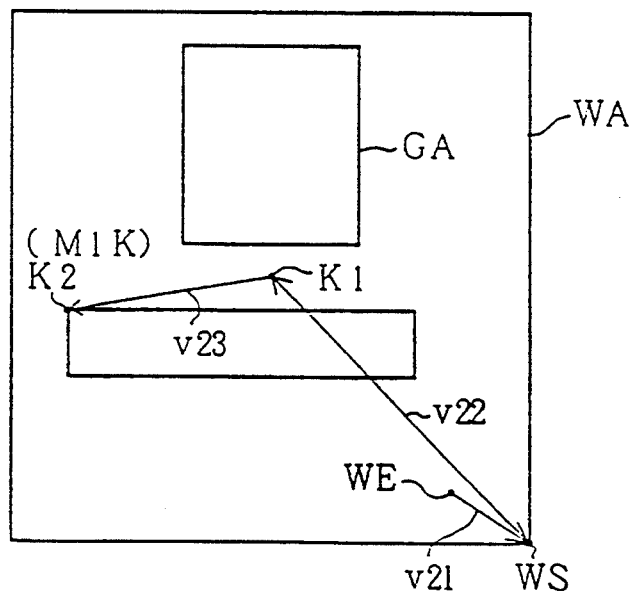
FIG. 36 is a similar view as FIGS. 34 and 35 but illustrating a manner of calculating a shift amount from the reference position of the outer profile of the frame pattern to a reference position of the outer profile of the first line character pattern arrangement position.
Figure 37:
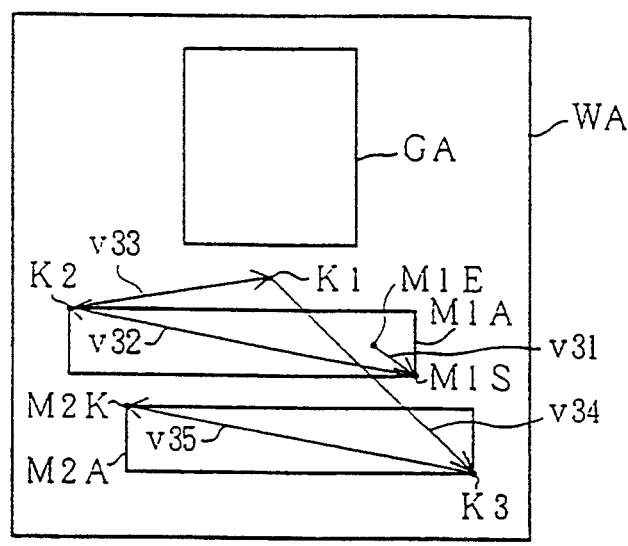
FIG. 37 is a similar view as FIGS. 34, 35 and 36 but illustrating a manner of calculating a shift amount from the reference position of the outer profile of the first line character pattern arrangement position to a reference position of the outer profile of the second line character pattern arrangement position.
Figure 38:
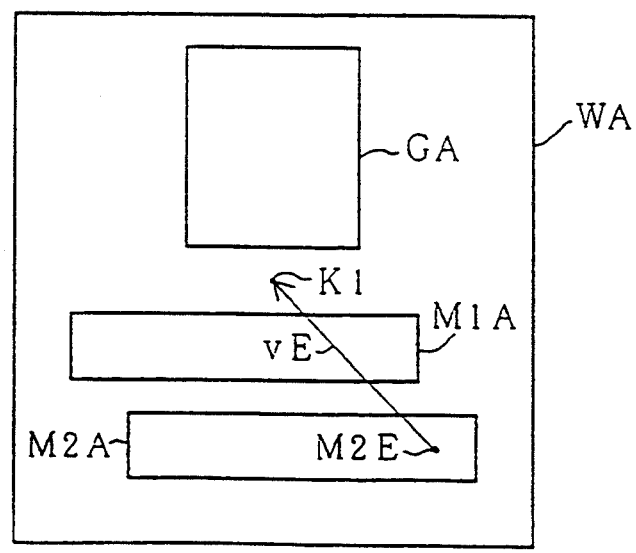
FIG. 38 is a similar view as FIGS. 34-37 but illustrating a manner of calculating a shift amount from the reference position of the outer profile of the second line character pattern arrangement position to the reference position of the outer profile of the frame pattern.

Accordingly, a reference point GK of the figure pattern outer profile GA is calculated from the reference position K1 and two vectors v1 and v2 as shown in FIG. 34; a reference point WK of the frame pattern outer profile WA is calculated from the reference position K1 and four vectors v11 to v14 as shown in FIG. 35; a reference point M1K of the first line arrangement position outer profile M1A is calculated from the reference position K1 and three vectors v21 to v23 as shown in FIG. 36; and a reference point M2K of the second line arrangement position outer profile M2A is calculated from the reference position K1 and five vectors v31 to v35 as shown in FIG. 37. It is to be noted that FIG. 38 illustrates a vector vE for moving the needle arrangement position back to the reference position K1 upon completion of the composite pattern. Furthermore, the vectors v11, v21 and v31 are provided in stitch data composing control which will be hereinafter described later.

Figure 22:
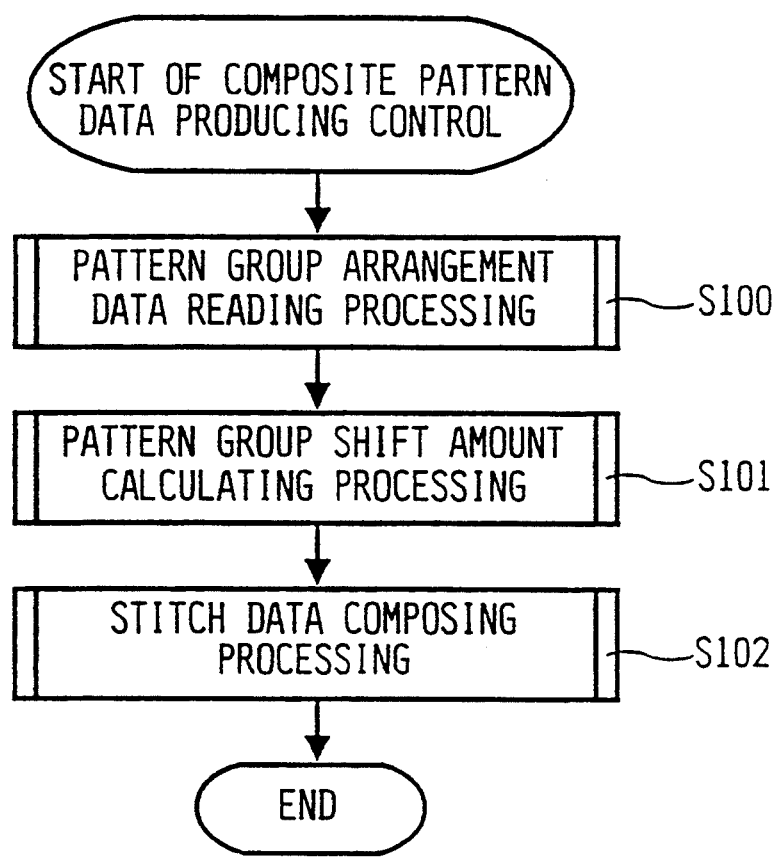
FIG. 22 is a flow chart of a routine of composite pattern data producing control.
Figure 23:
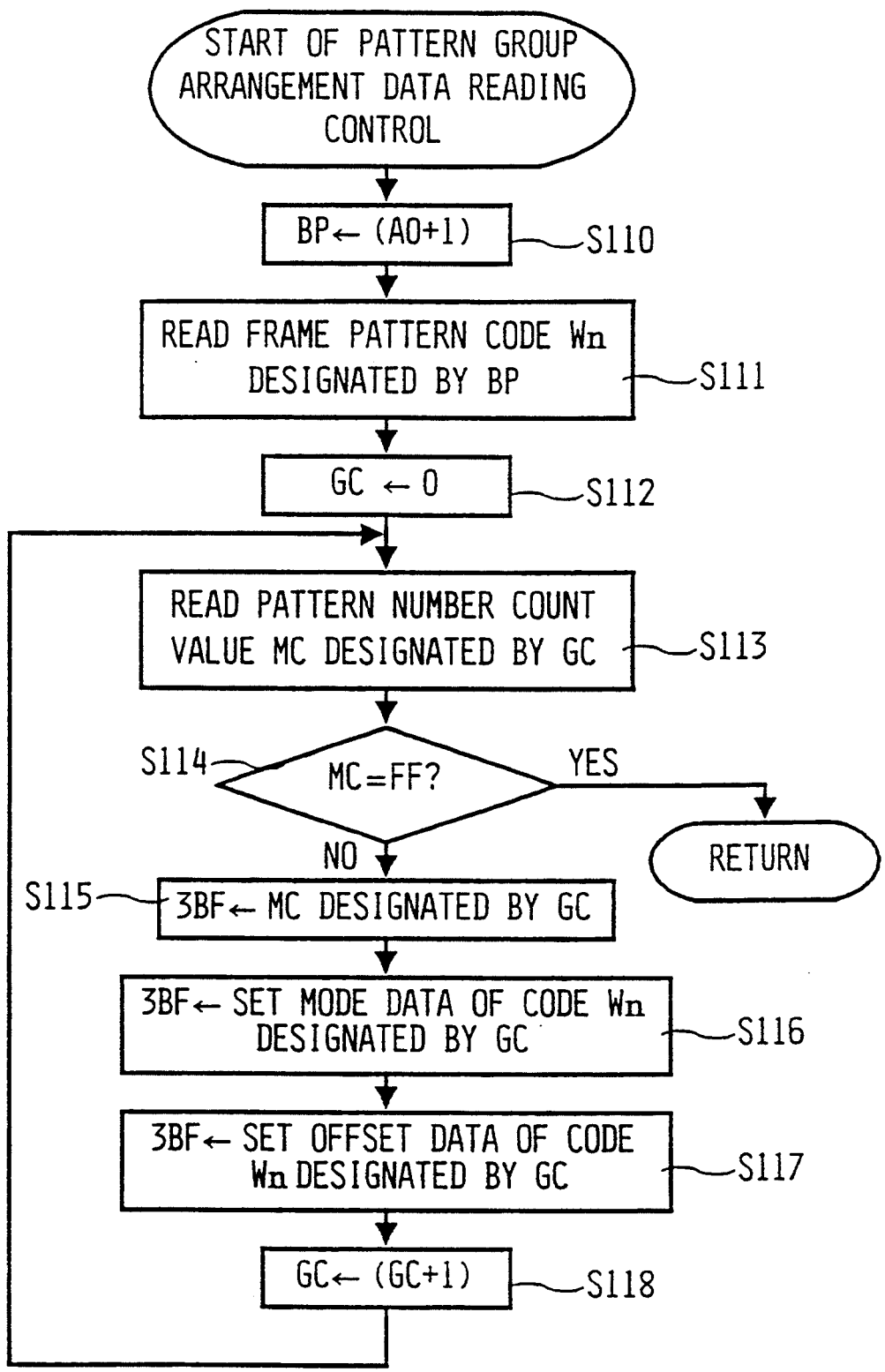
FIG. 23 is a flow chart of a routine of pattern group arrangement data reading control.
Figure 24:
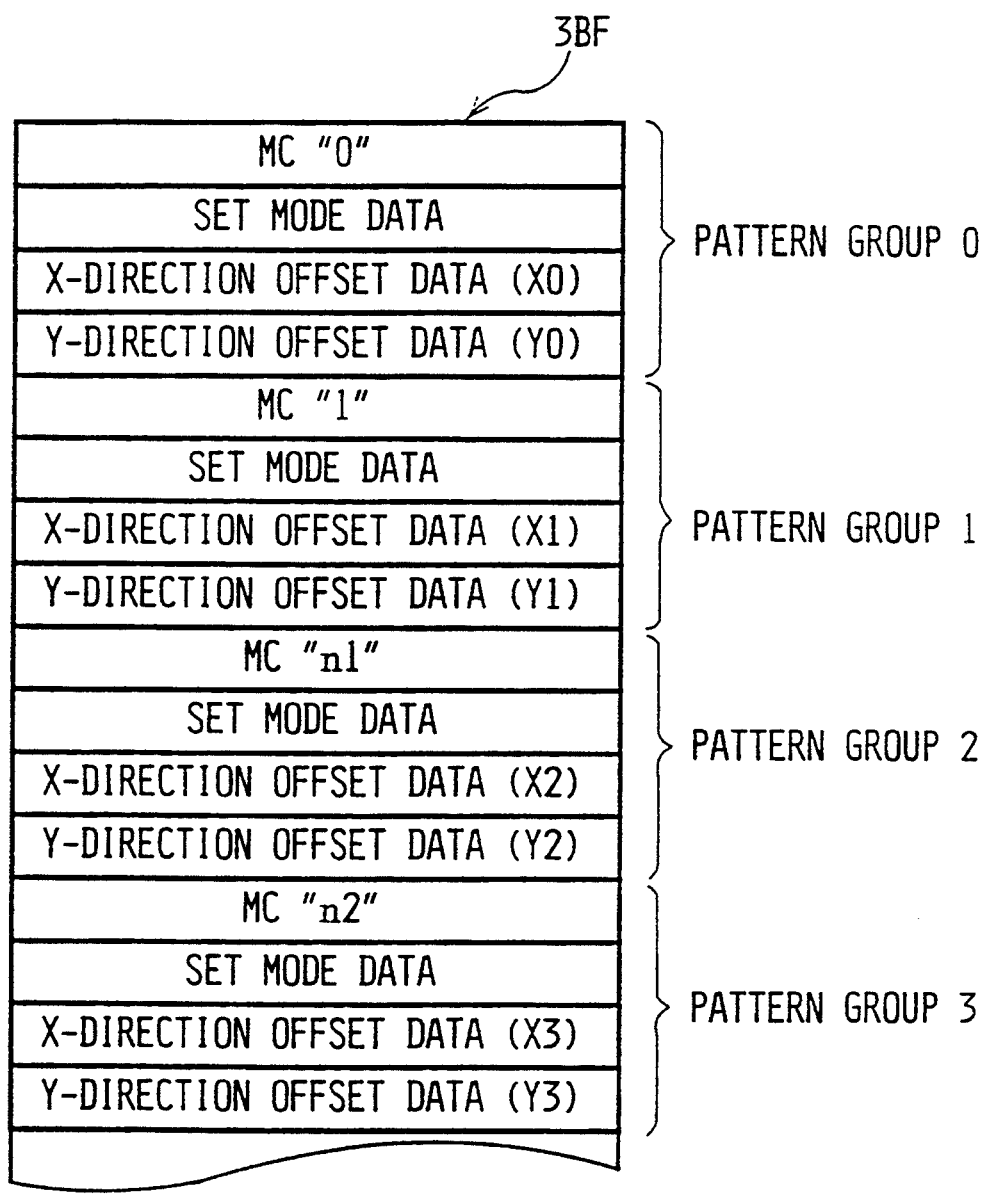
FIG. 24 is a diagrammatic representation illustrating data construction of data stored in a third buffer.

Referring to FIG. 22, after the present control is started, pattern group arrangement data reading control (FIG. 23) is first executed (S100). Referring to FIG. 23, after the processing is started, an address next to the start address A0 is first stored into the buffer pointer BP (S110), and then, a frame pattern code Wn stored at the address of the first buffer 1BF designated by the buffer pointer BP is read in (S111), before a pattern group count value GC indicative of any of the pattern groups 1 to 3 is cleared (S112). Subsequently, a pattern number count value MC indicated by the pattern group count value GC is read in from the second buffer 2BF (S112), and then, when the count value GC is not the end code "FF" (S114: No), the count value MC read in at step S113 is stored into the third buffer 3BF (S115). Then, set mode data of the frame pattern code Wn designated by the pattern group count value GC are stored into the third buffer 3BF (S116), and offset data (Xn, Yn) of the frame pattern code Wn designated by the pattern group count value GC are stored into the third buffer 3BF (S117), before the pattern group count value GC is incremented by one (S118). Then, the control sequence returns to step S113 to repeat the succeeding steps of operations described above until the processing is completed with the pattern group 3. Then, when the count value GC read out is equal to "FF" (S114: Yes), the present control is completed and the control sequence returns to the original routine. Due to the present control, a pattern number count value MC, set mode data and X and Y offset data are stored for each of the pattern groups 0 to 3 in the third buffer 3BF as shown in FIG. 24.

Figure 25:
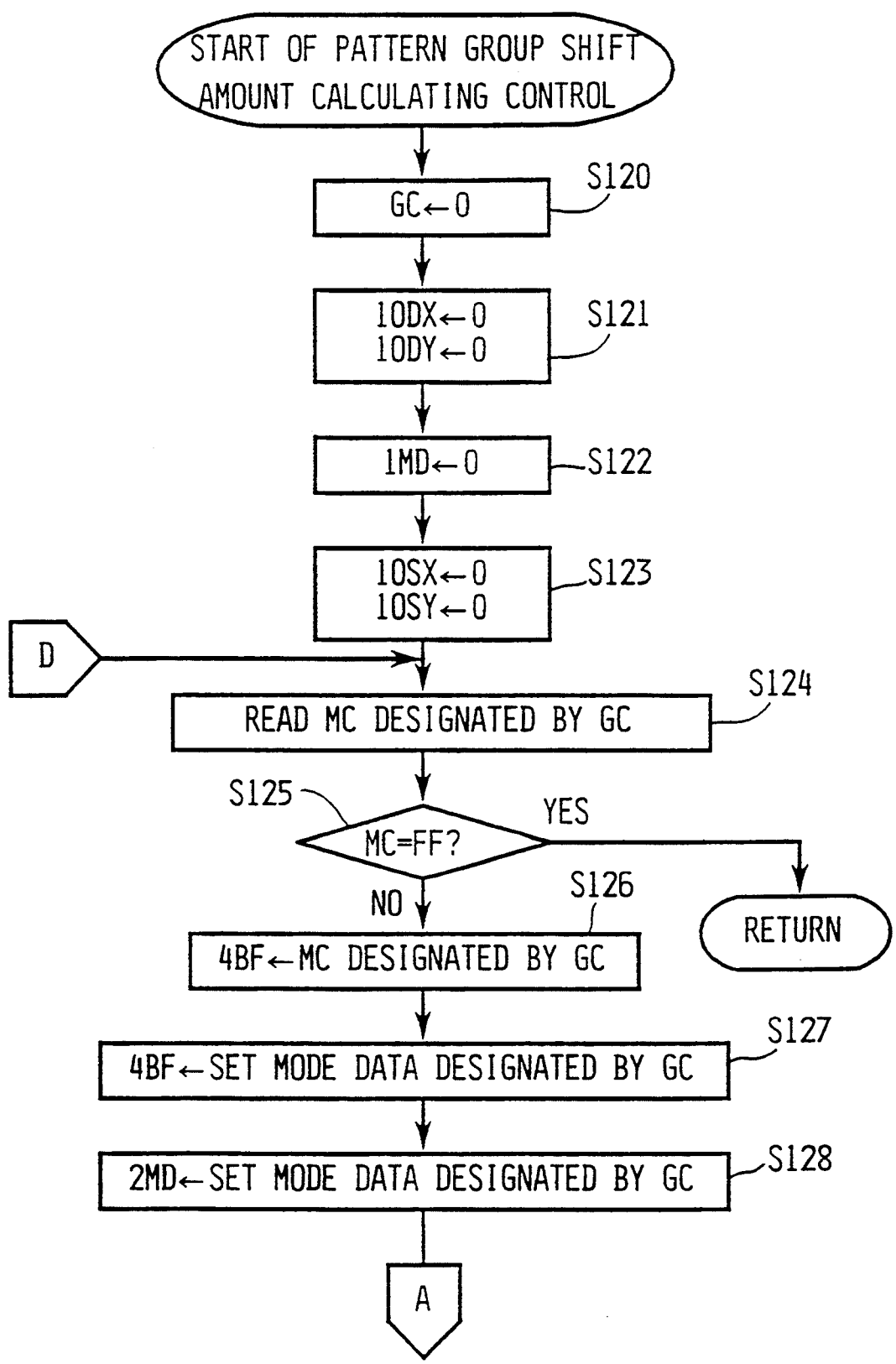
FIGS. 25 to 28 are flow charts showing a routine of pattern group shift amount calculating control.

Referring back to FIG. 22, subsequently, pattern group shift amount calculating control (FIGS. 25 to 28) for calculating a shift amount for the formation of a pattern of a next pattern group when patterns of different pattern groups are to be successively formed is executed (S101). Referring to FIG. 25, after the present control is started, the pattern group count value GC is cleared first (S120), and a first X-direction size 10DX of a buffer of a capacity for storing size data of a maximum outer profile of a pattern group in the X-direction and a first Y-direction size 10DY of another buffer of a capacity for storing size data of such outer profile in the Y-direction are cleared (S121), and then, a first set mode buffer 1MD for storing therein such set mode data of 1 byte as described above is reset (S122). Then, a first X-direction offset amount 10SX of an offset buffer for storing X-direction offset data of a pattern group and a first Y-direction offset amount 10SY of another offset buffer for storing Y-direction offset data of such pattern group are cleared (S123).

Subsequently, a pattern number count value MC of the second buffer 2BF designated by the pattern group count value GC is read in (S124), and when the count value GC is not equal to "FF" (S125: No), the count value MC read in at step S124 is stored into the fourth buffer 4BF (S126). Then, set mode data of the third buffer 3BF designated by the pattern group count value GC are stored into the fourth buffer 4BF (S127), and the set mode data thus read out are stored also into a second set mode buffer 2MD (S128).

Figure 26:
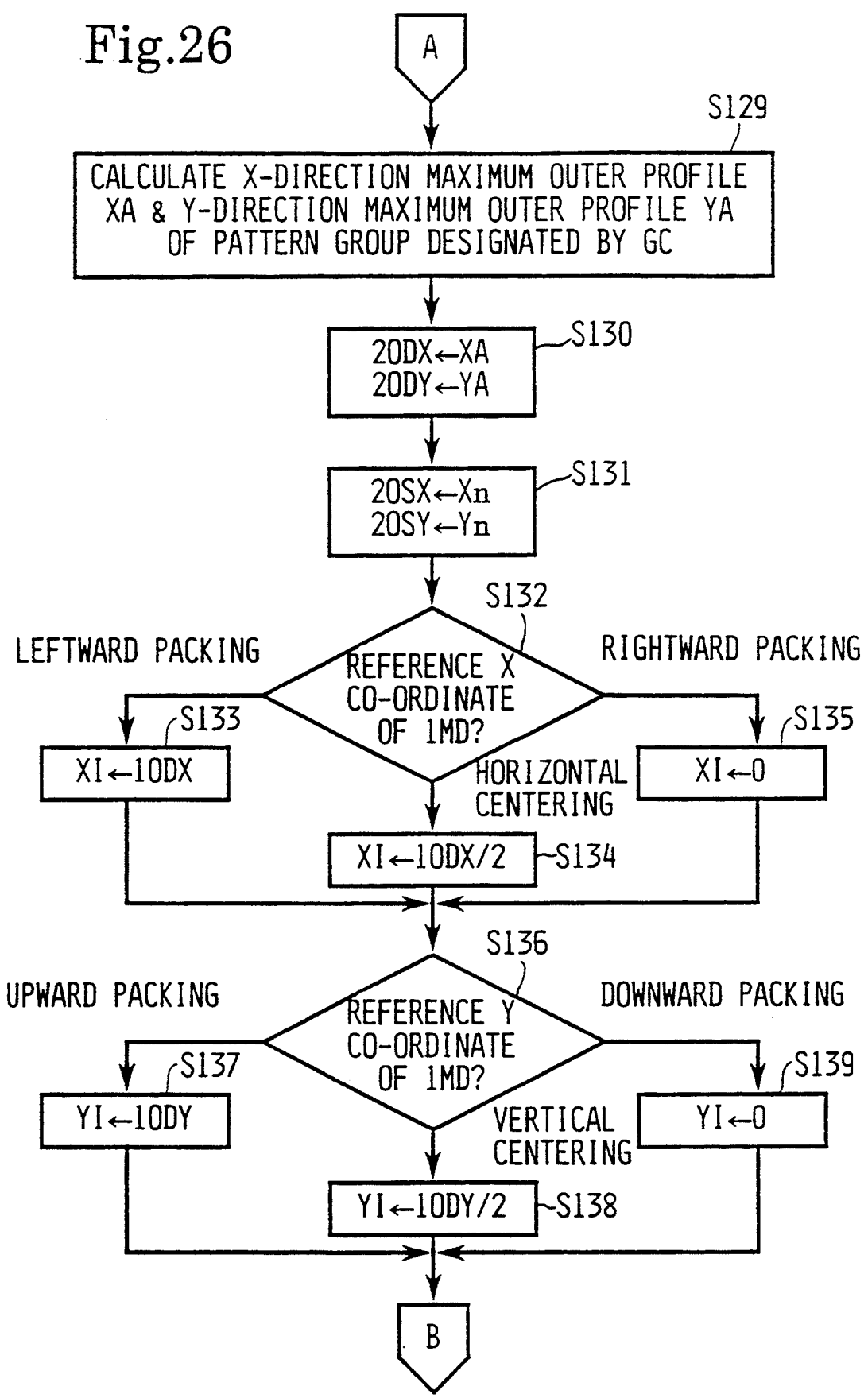

Referring now to FIG. 26, subsequently, an X-direction maximum outer profile XA and a Y-direction maximum outer profile YA of a pattern group designated by the pattern group count value GC are calculated (S129). Here, each of the first line arrangement position outer profile and the second line arrangement position outer profile is constituted of a plurality of character patterns M. Reference should be made to a frame pattern outer profile WA, a figure pattern outer profile GA, a first line arrangement position outer profile M1A and a second line arrangement position outer profile M2A shown in FIG. 33. Subsequently, the X-direction maximum outer profile XA is stored into a second X-direction size 20DX and the Y-direction maximum outer profile YA is stored into a second Y-direction size 20DY (S130), and then, X-direction offset data Xn of the third buffer 3BF designated by the pattern group count value GC are stored into a second X-direction offset amount 20SX and the Y-direction offset data Yn are stored into a second Y-direction offset amount 20SY (S131).

Figure 32A:
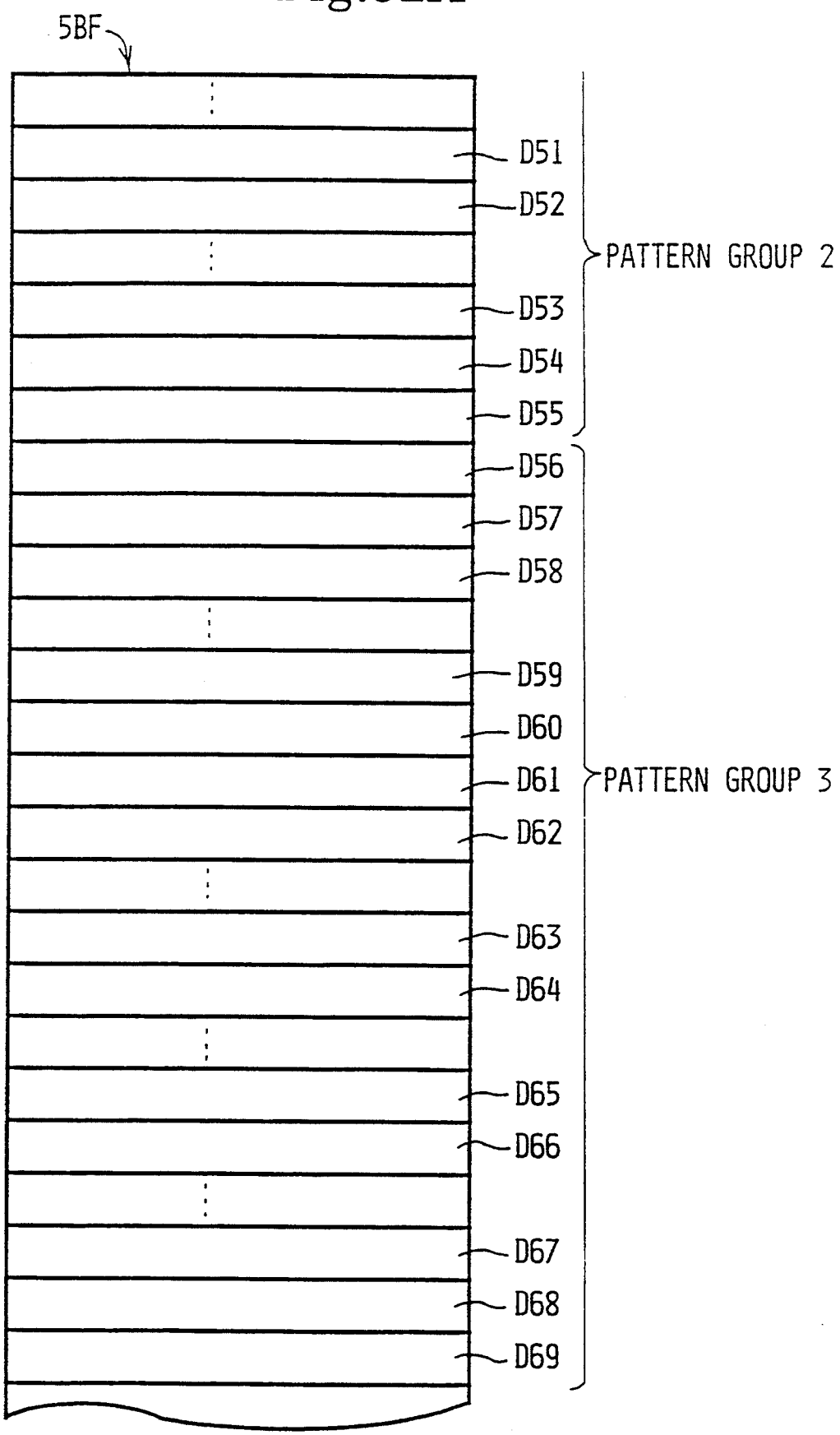
FIG. 32A is a diagrammatic representation illustrating another part of data construction of the data stored in the fifth buffer.

Subsequently, when the X-coordinate of the reference position of the first set mode buffer 1MD is the left packing "01" (S132: leftward packing), the first X-direction size 10DX is stored into an X-direction shift amount XI (S133); when the X-coordinate of the reference position is the horizontal centering "10" (S132: horizontal centering), a half of the first X-direction size 10DX is stored into the X-direction shift amount XI (S134); but when the X-coordinate of the reference position is the right packing "11" (S132: rightward packing), the value "0" is stored into the X-direction shift amount XI (S135). Similarly, when the Y-coordinate of the reference position of the first set mode buffer 1MD is the upward packing "01" (S136: upward packing), the first Y-direction size 10DY is stored into a Y-direction shift amount YI (S137); when the Y-coordinate of the reference position is the vertical centering "10" (S136: horizontal centering), a half of the first Y-direction size 10DY is stored into the Y-direction shift amount YI (S138); but when the Y-coordinate of the reference position is the right packing "11" (S136: right packing), the value "0" is stored into the Y-direction shift amount YI (S139). It is to be noted that, when data of the first set mode buffer 1MD are in a cleared condition, the control sequence follows the steps S132 to S139. Here, the vector v32 of FIG. 32 is calculated at steps S133 and S137, and the vector v12 of FIG. 36 and the vector v22 of FIG. 36 are calculated at steps S134 and S138.

Figure 27:
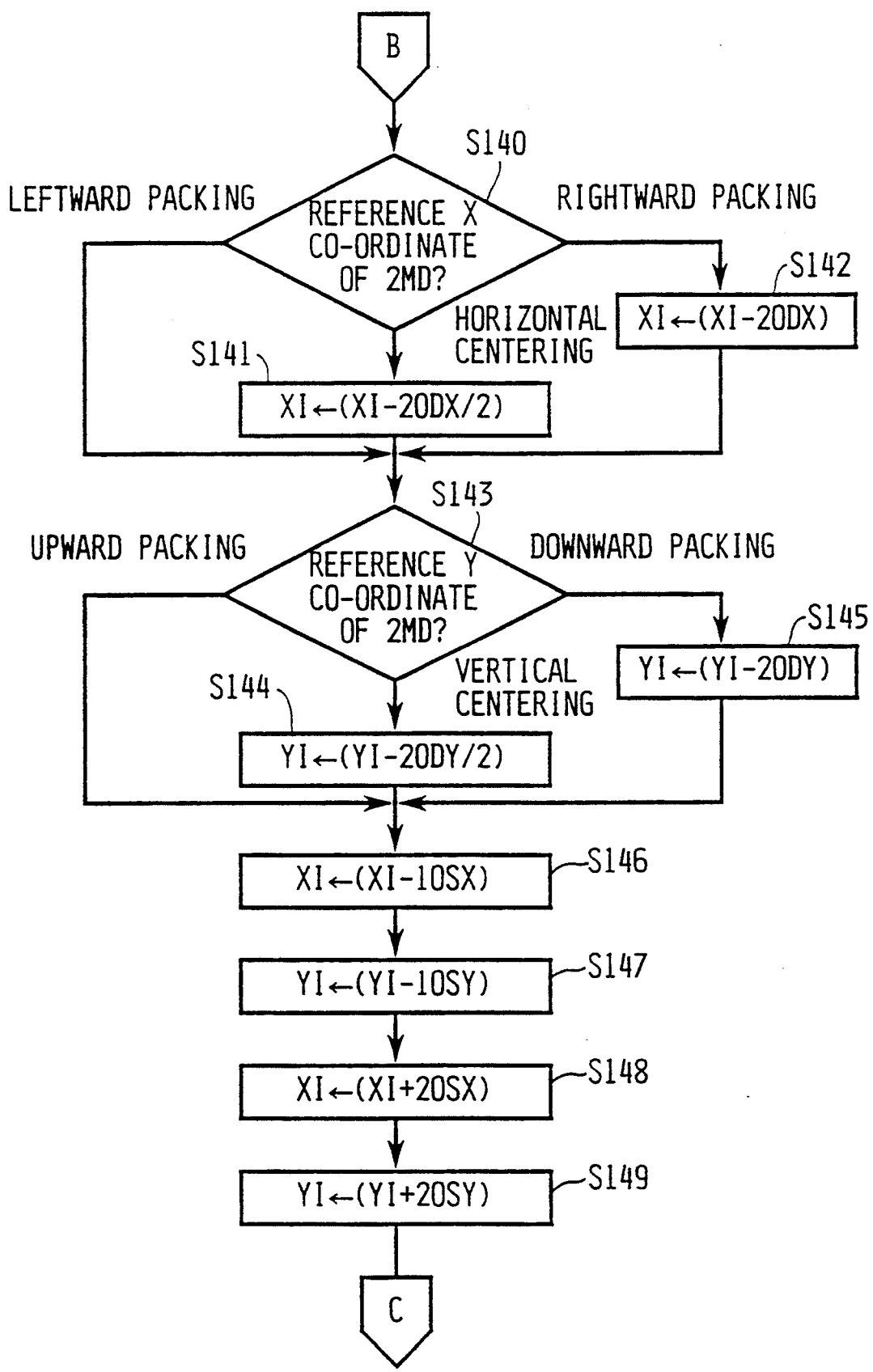

Referring now to FIG. 27, subsequently, when the X-coordinate of the reference position of the second set mode buffer 2MD is the horizontal centering "10" (S140: horizontal centering), a value obtained by subtraction of a half of the second X-direction size 20DX from the X-direction shift amount XI is stored as an X-direction shift amount XI (S141); but when the X-coordinate of the reference position is the rightward packing "11" (S140: rightward packing), a value obtained by subtraction of the second X-direction size 20DX from the first X-direction shift amount XI is stored as an X-direction shift amount XI (S142). Similarly, when the Y-coordinate of the reference position of the second set mode buffer 2MD is the vertical centering "10" (S143: vertical centering), a value obtained by subtraction of a half of the second Y-direction size 20DY from the Y-direction shift amount YI is stored as a Y-direction shift amount YI (S144); but when the Y-coordinate of the reference position is the downward packing "11" (S140: downward packing), a value obtained by subtraction of the second Y-direction size 20DY from the first Y-direction shift amount YI is stored as a Y-direction shift amount YI (S145). Here, the vector v2 of FIG. 34 and the vector v14 of FIG. 35 are calculated at steps S141 and S144, and the vector v35 of FIG. 37 is calculated at steps S142 and S145.

Subsequently, the first X-direction offset amount 10SX is subtracted from the X-direction shift amount XI to calculate a new X-direction shift amount XI (S146), and the first Y-direction offset amount 10SY is subtracted from the Y-direction shift amount YI to calculate a new Y-direction shift amount YI (S147). Furthermore, the second X-direction offset amount 20SX is added to the X-direction shift amount XI to calculate a final X-direction shift amount XI (S148), and the second Y-direction offset amount 20SY is added to the Y-direction shift amount YI to calculate a final Y-direction shift amount YI (S149). Here, the vector v13 of FIG. 35 and the vector v33 of FIG. 37 are calculated at steps S146 and S147, and the vector v1 of FIG. 36, the vector v23 of FIG. 36 and the vector v34 of FIG. 37 are calculated at steps S148 and S149.

Figure 28:
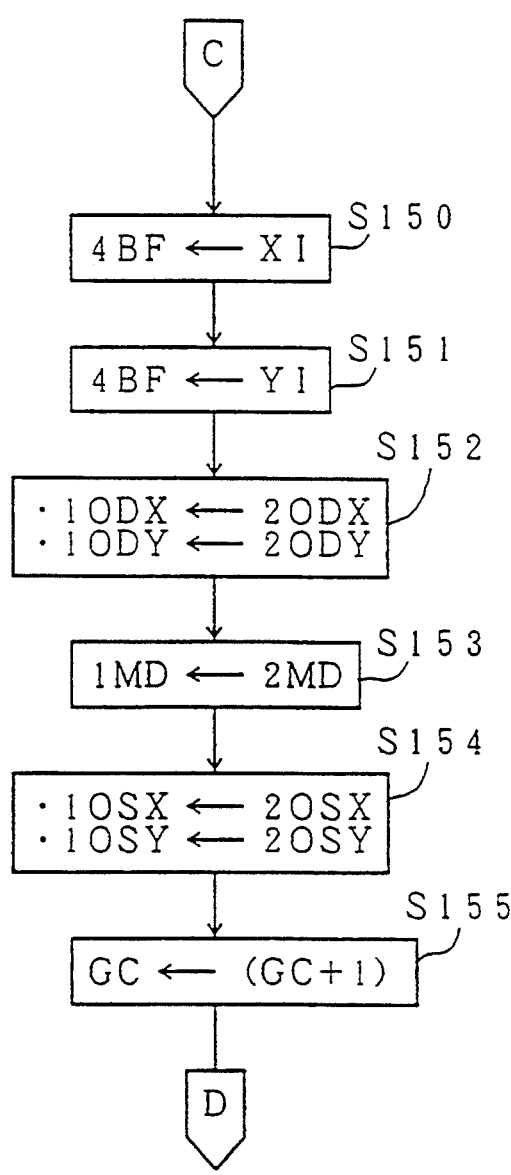
Figure 29:
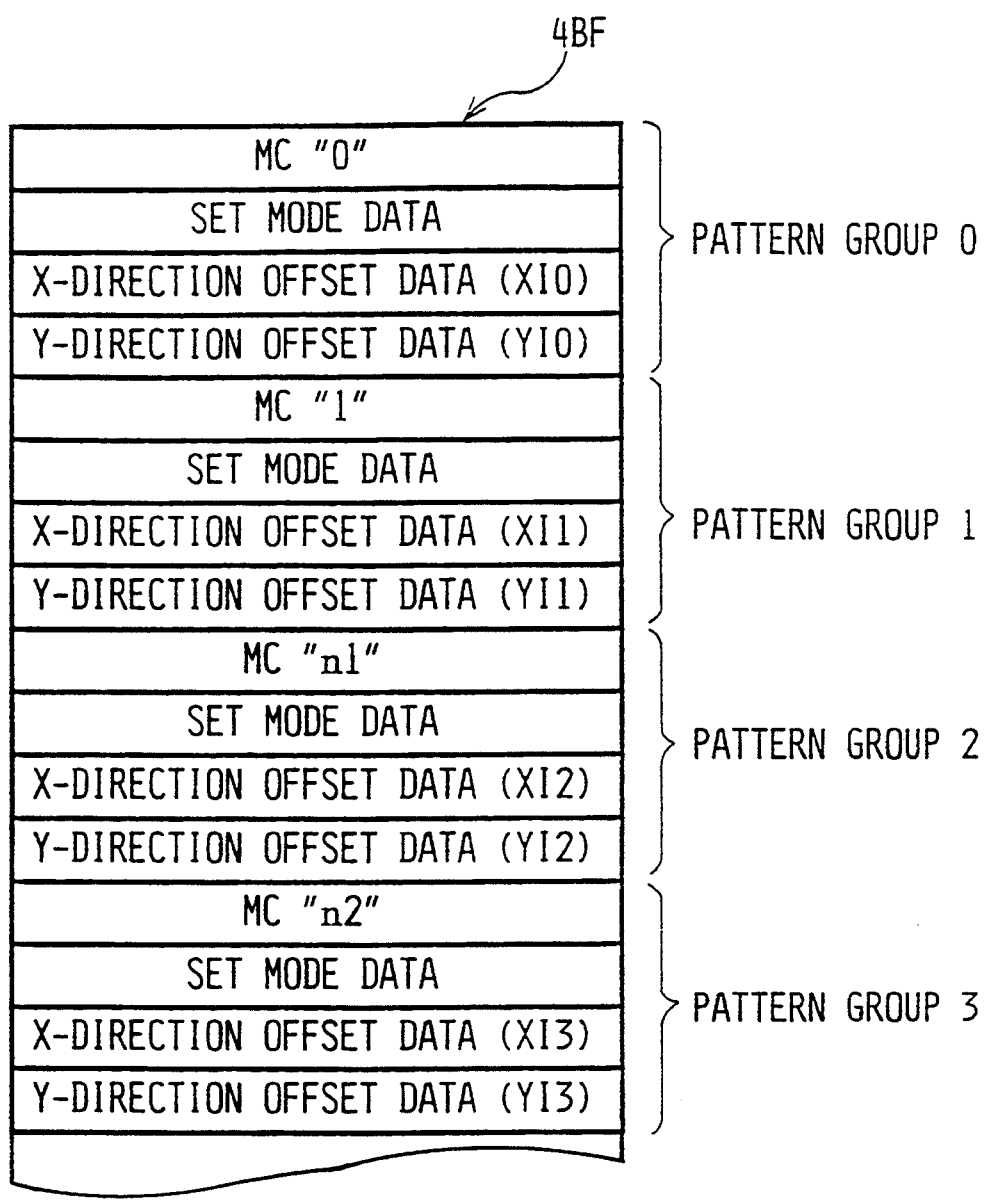
FIG. 29 is a diagrammatic representation illustrating data construction of data stored in a fourth buffer.

Referring now to FIG. 28, subsequently, the final X-direction shift amount XI is stored into the fourth buffer 4BF (S150), and the final Y-direction shift amount YI is stored into the fourth buffer 4BF (S151). Then, the second X-direction size 20DX is stored as a first X-direction size 10DX and the second Y-direction size 20DY is stored as a first Y-direction size 10DY (S152), and a value of the second set mode buffer 2MD is stored as a value of the first set mode buffer 1MD (S153). Furthermore, the second X-direction offset amount 20SX is stored as a first X-direction offset amount 10SX and the second Y-direction offset amount 20SY is stored as a first Y-direction offset amount 10SY (S154), and the pattern group count value GC is incremented by one (S155), before the control sequence advances to step S124 of FIG. 25. Then, the steps S124 to S155 executed for each of the pattern groups, and when the pattern number count value MC thus read in is equal to "FF" (S125: Yes), the present control is completed and the control sequence returns to the original routine. Due to the present control, a pattern number count value MC, set mode data and X and Y shift amount data are stored for each of the pattern groups 0 to 3 in the fourth buffer 4BF as shown in FIG. 29.

Figure 30A:
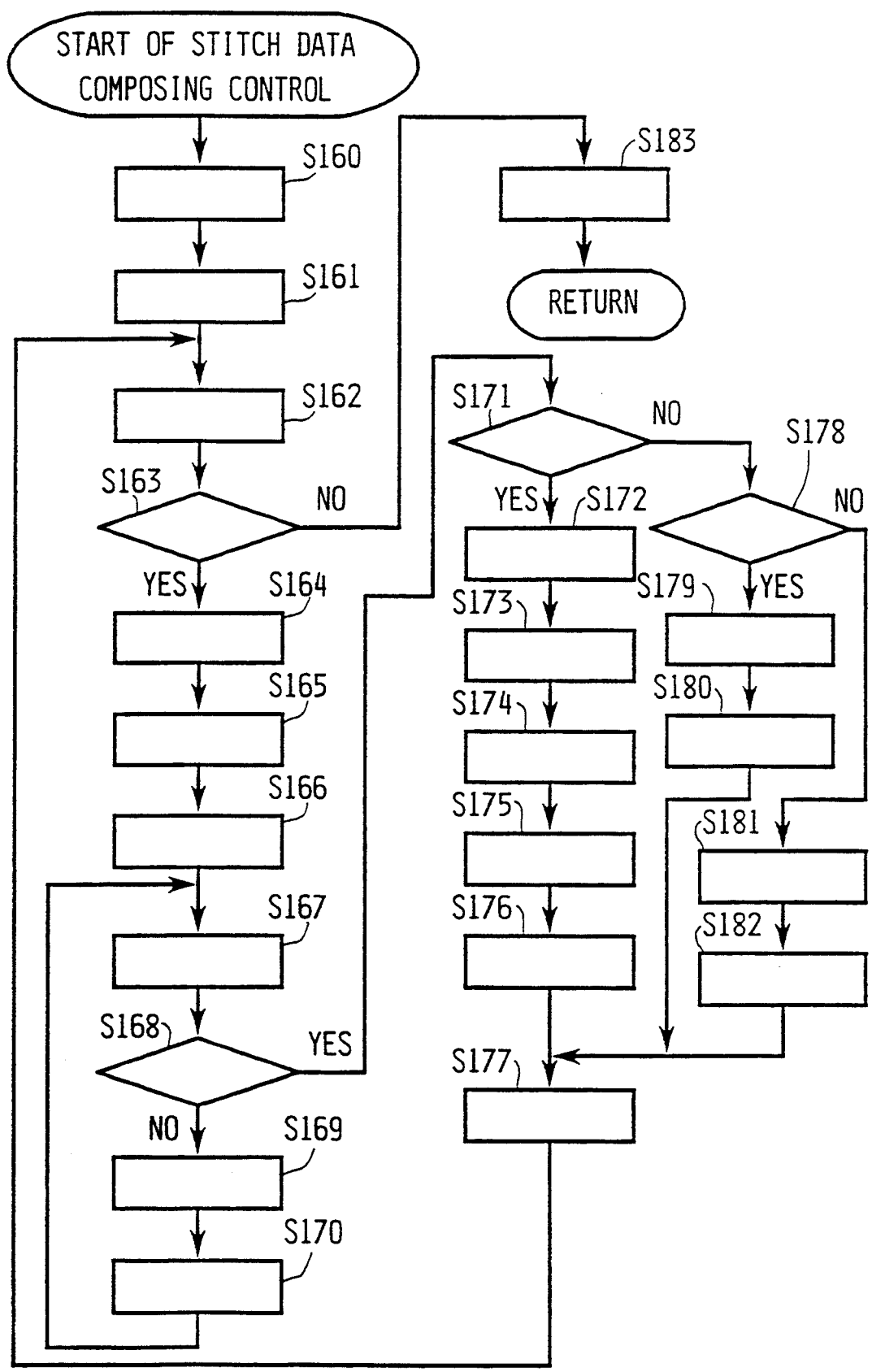
FIG. 30A is a flow chart of a routine of stitch data composing control.
Figure 31A:
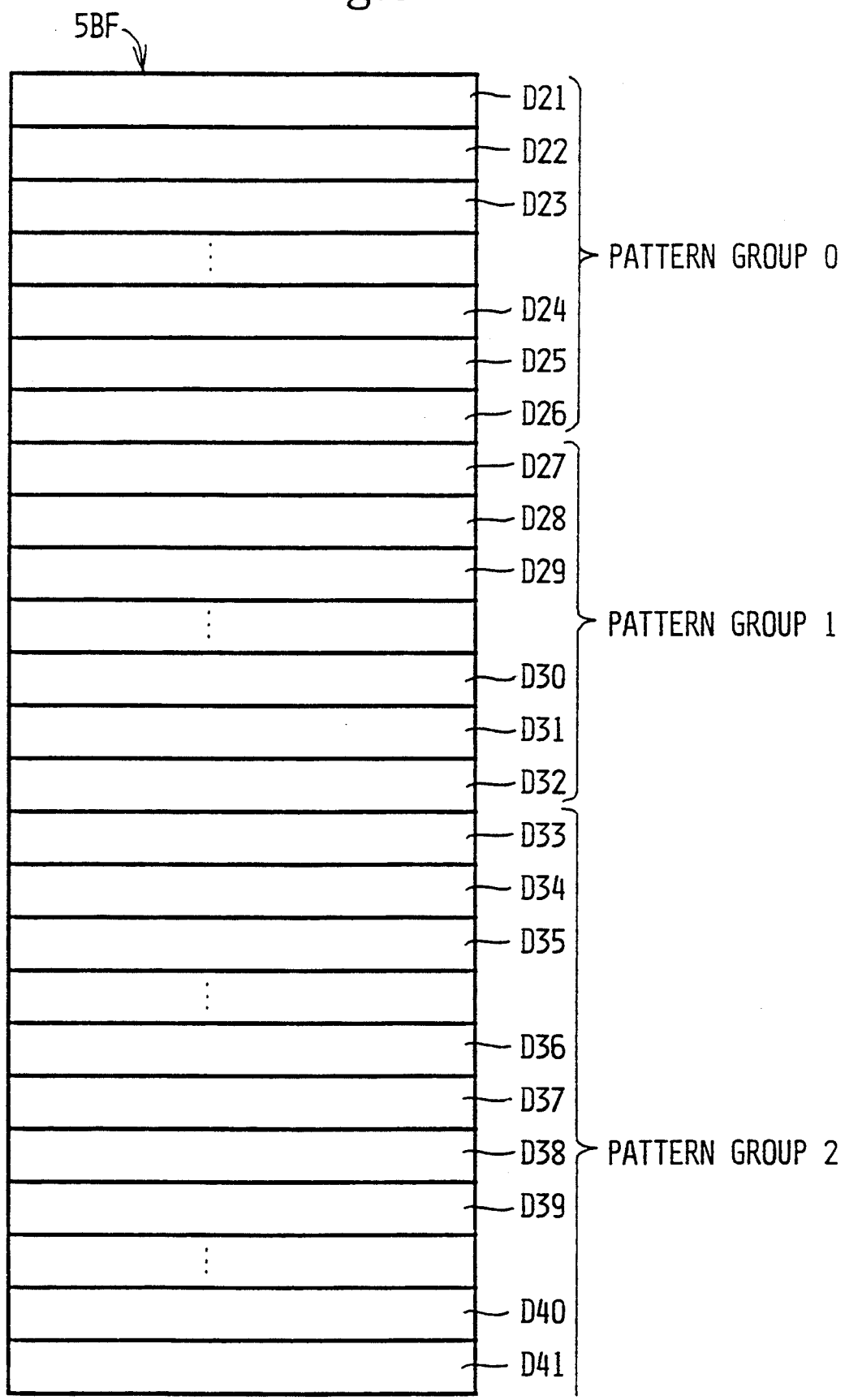
FIG. 31A is a diagrammatic representation illustrating part of data construction of data stored in a fifth buffer.

Referring back to FIG. 22, stitch data composing control (FIG. 30) is executed subsequently (S102). Referring now to FIG. 30, when the present control is started, the start address A0 is first stored into the buffer pointer BP and the pattern group count value GC and the pattern number count value MC are cleared (S160), and then X- and Y-direction shift amounts XI and YI of the fourth buffer 4BF designated by the pattern group count value GC are stored into the fifth buffer 5BF (S161). Then, data of the first buffer 1BF designated by the buffer pointer BP are read in (S162), and when the data are a pattern code (S163: Yes), a start address of pattern data corresponding to the pattern code is stored into an address pointer AP (S164). Then, pattern size data of the pattern data are read in (S165), and a development position buffer TB for storing therein a development position where positions of stitches are developed successively on calculations is cleared (S166).

Subsequently, stitch data involved in the pattern data are read in in order of positions of stitches (S167), and when the data are not stitch ending data (S168: No), the stitch data are stored into the fifth buffer 5BF (S169). The stitch data are added to the development position buffer TB and the address pointer AP is incremented by a predetermined address number ($a_7$) (S170), before the control sequence returns to step S167. Then, when the stitch data thus read in are the ending data (S168: Yes), if a pattern number count value MC of the second buffer 2BF designated by the pattern group count value GC and a current pattern number count value MC are equal to each other (S171: Yes), end point data ED for shifting the current stitch position TB to the end point E (refer to FIG. 39) of the pattern are calculated (S172), and the end point data ED are stored into the fifth buffer 5BF (S173). Furthermore, the pattern ending data "FF" indicating an end of the pattern are stored into the fifth buffer 5BF (S174). Subsequently, the pattern group count value GC is incremented by one (S175), and X- and Y-direction shift amounts XI and YI of the fourth buffer 4BF designated by the pattern group count value GC are stored into the fifth buffer 5BF (S176). Then, the buffer pointer BP and the pattern number count value MC are incremented by one (S177), before the control sequence returns to step S162. Here, the end point data ED calculated at step S172 correspond to the vector v11 of FIG. 35, vector v21 of FIG. 36 and vector v31 of FIG. 37.

Figure 39:
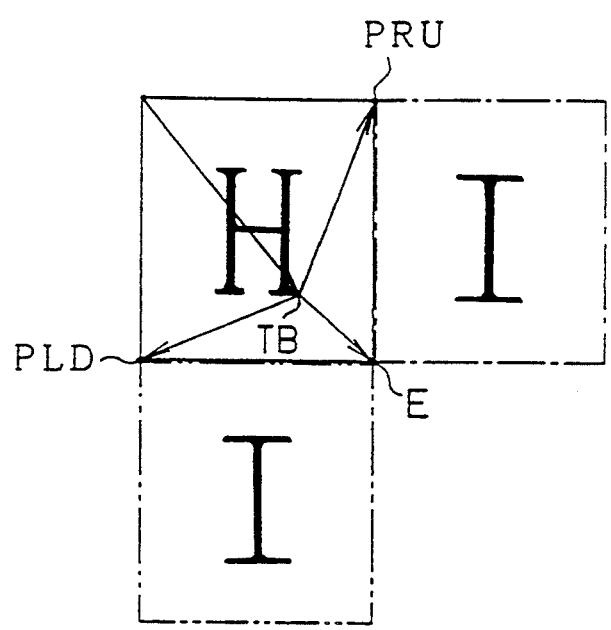
FIG. 39 is a similar view as FIGS. 34-38 but illustrating a manner of calculating connection end data for connecting character patterns to each other in accordance with a direction of arrangement of character patterns.

By the way, when a pattern number count value MC of the second buffer 2BF designated by the pattern group count value GC and a current pattern number count value MC are not equal to each other, that is, when the character pattern M continues to a next character pattern (S171: No), when the character arrangement direction of the frame pattern code Wn is the horizontal direction (S178: Yes), since, for example, a next character pattern "I" is to be formed on the right-hand side of the character pattern "H" as shown in FIG. 39, end point data ED for shifting a current stitch position TB to a right upper point PRU of the pattern "I" (S179), and the end point data ED are stored into the fifth buffer 5BF (S180), before the control sequence advances to step S177. On the other hand, when the character arrangement direction of the frame pattern code Wn is the vertical direction (S178: No), since, for example, a next character pattern "I" is to be formed below the character pattern "H" as shown in FIG. 39, end point data ED for shifting a current stitch position TB to a left lower point PLD of the pattern "I" are calculated (S181), and the end point data ED are stored into the fifth buffer 5BF (S182), before the control sequence advances to step S177. On the other hand, when data of the first buffer 1BF designated by the buffer pointer BP are not pattern data, that is, when such data are the ending data "FF" (S163: No), the ending data "FF" are stored into the fifth buffer 5BF (S183), and the present control is completed and also the composite pattern data producing control is completed.

Figure 9:
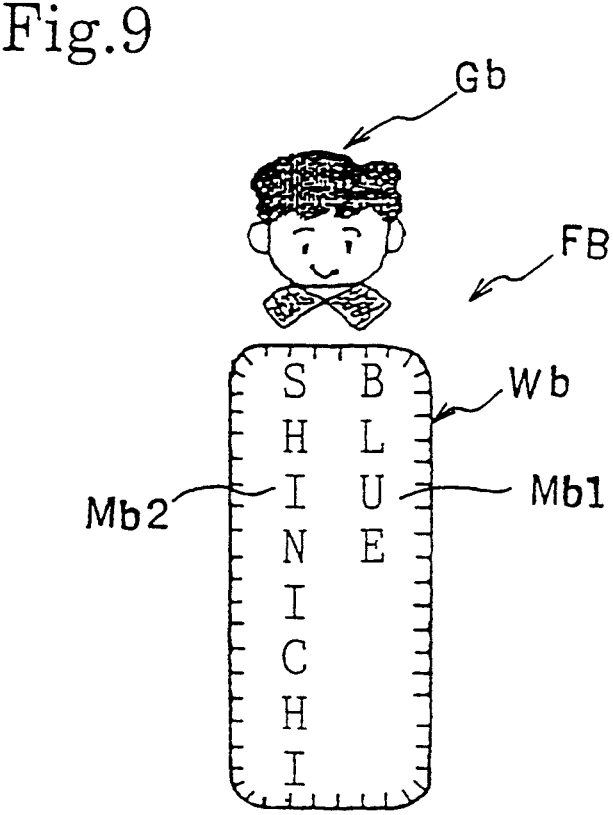
FIG. 9 is an illustration showing another sample sewn composite pattern formed from a frame pattern, a figure pattern and a plurality of character patterns arranged in vertical columns.
Figure 10:
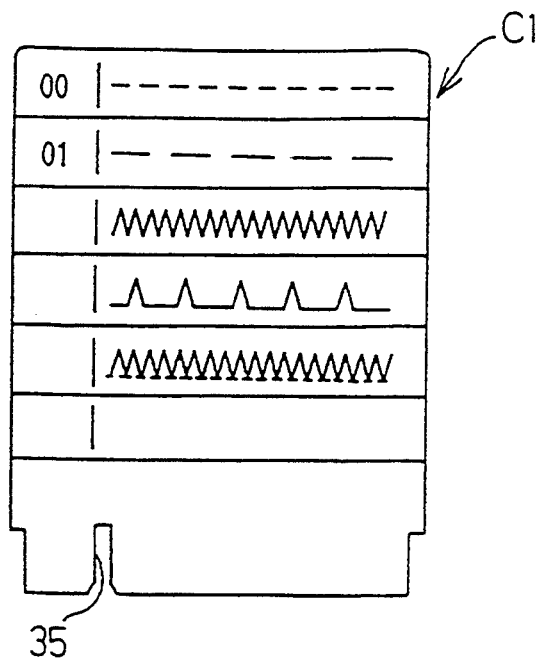
FIG. 10 is a front elevational view of a practical pattern selection card.
Figure 11:
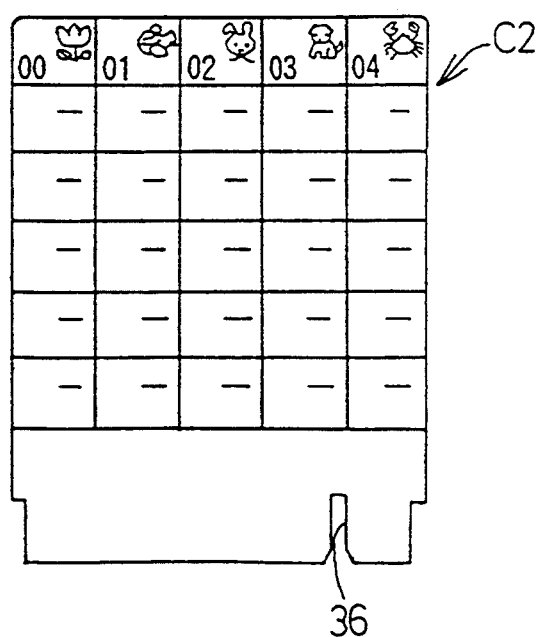
FIG. 11 is a front elevational view of a figure pattern selection card.
Figure 12:
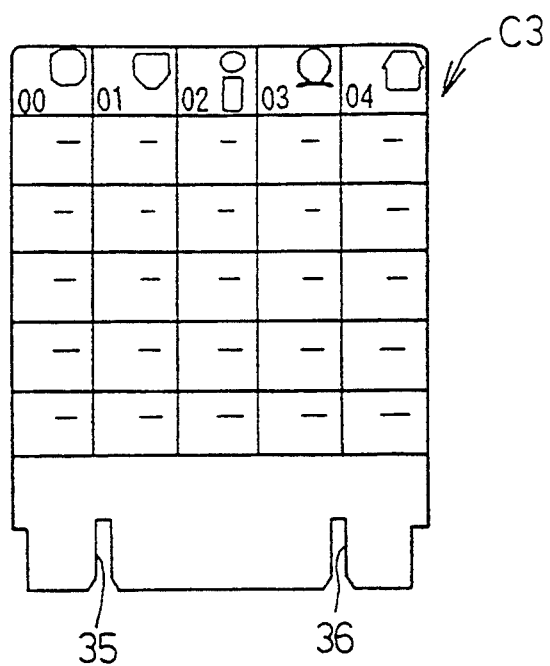
FIG. 12 is a front elevational view of a frame pattern selection card.
Figure 13:
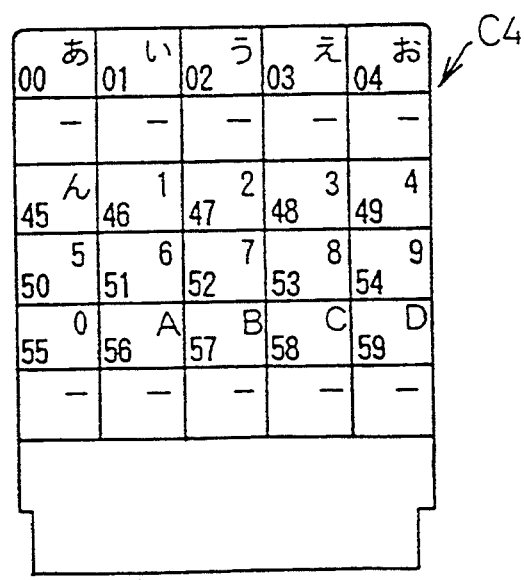
FIG. 13 is a front elevational view of a character pattern selection card.

Then, such a composite pattern as shown in FIG. 8 or 9 is formed with an attractive appearance by the embroidering apparatus 30 in accordance with the composite pattern data of a composite pattern stored in the fifth buffer 5BF.

As described so far, since arrangement position data of a figure pattern G and/or a plurality of character patterns M and maximum pattern number data of character patterns M are set for each of a plurality of frame patterns W, composite pattern data of a composite pattern of an attractive appearance wherein a figure pattern G is always arranged at an optimum position with respect of an arbitrarily selected frame pattern W and particularly the number of character patterns M is automatically limited to a preset maximum number such that a plurality of character patterns M are arranged at optimum positions with respect to the frame pattern W can be produced readily.

It is to be noted that it is also possible to store pattern data and other various data, which are stored in the ROM 26 of the controlling apparatus C and are illustrated in FIG. 4, alternatively into an external memory such as a ROM card or a floppy disk. Also, the present invention can naturally be applied to various pattern data processing apparatus for sewing machines by which various pattern stitches including figure patterns and frame patterns can be sewn.

What is claimed is:

1. A pattern data processing apparatus for a sewing machine for producing composite pattern data for sewing a composite pattern including a reference pattern and at least one unit pattern, comprising:
   unit pattern data storage means for storing pattern data of a plurality of unit patterns;
   reference data storage means for storing pattern data of a plurality of reference patterns and arrangement position data for a plurality of unit patterns;
   pattern selecting means for selectively setting one of the reference patterns and at least one of the unit patterns to be combined with the one reference pattern to form the composite pattern;
   data composing means for composing composite pattern data of a composite pattern in accordance with data from said reference data storage means regarding the reference pattern selected by said pattern selecting means and data from said unit pattern data storage means regarding the at least one of the unit patterns selected by said pattern selecting means, said data composing means setting an arrangement position of the at least one selected unit pattern with respect to the reference pattern based on the arrangement position data; and
   composite pattern data storage means for storing data composed by said data composing means.

2. The pattern data processing apparatus according to claim 1, wherein the pattern selecting means comprises pattern selecting keys and a card receiving slot for receiving pattern selection cards.

3. The pattern data processing apparatus according to claim 1, wherein the unit pattern data storage means stores data of start addresses of unit patterns.

4. The pattern data processing apparatus according to claim 1, wherein said reference data storage means stores set mode data, X-direction offset data and Y-direction offset data regarding a pattern group including the plurality of unit patterns.

5. The pattern data processing apparatus according to claim 4, wherein the set mode data comprises data representing a reference position with an X-coordinate value and a Y-coordinate value when a location of a maximum profile determined by the pattern group is arranged with respect to a center position of an outer profile of the reference pattern.

6. The pattern data processing apparatus according to claim 4, wherein the X-direction offset data and the Y-direction offset data is data representing an amount of displacement of a center position of an outer profile of the pattern group from a center position of a maximum profile determined by the reference pattern.

7. The pattern data processing apparatus according to claim 1, wherein the unit pattern data storage means stores data of size data and compressed stitch data.

8. The pattern data processing apparatus according to claim 1, wherein said data composing means comprises position means for calculating a stitch starting position of a pattern group including the plurality of unit patterns with respect to a center position of an outer profile of the reference pattern.

9. The pattern data processing apparatus according to claim 8, wherein said position means calculates the stitch starting position based on data representing the center position of the reference pattern, a reference position of an outer profile determined by the pattern group and an X-direction and Y-direction size of the outer profile determined by the pattern group.

10. The pattern data processing apparatus according to claim 1, wherein the data composing means comprises shift means for calculating a shift amount for the formation of successive unit patterns with respect to the selected reference pattern.

11. Pattern data processing apparatus for a sewing machine for producing composite patterns, each composite pattern formed of a reference pattern and at least one unit pattern, comprising:
    memory means for storing data for a plurality of reference patterns and a plurality of unit patterns, the data including size data of a maximum number of unit patterns which correspond to each reference pattern;
    selecting means for selecting one of said reference patterns and at least one of said unit patterns;
    data composing means for combining the data for the selected reference pattern with the data for the selected at least one unit pattern comprising shift means for calculating a shift amount for the formation of successive unit patterns with respect to the selected reference pattern, wherein the number of selected unit patterns is limited to the maximum number of unit patterns that can be arranged with the selected reference pattern; and
    composite pattern data storage means for storing the combined data from the data composing means.

12. Pattern data processing apparatus according to claim 11, wherein the selecting means comprises pattern selecting keys and a card receiving slot for receiving pattern selection cards.

13. Pattern data processing apparatus according to claim 11, wherein the memory means stores data of start addresses of reference patterns and data of start addresses of unit patterns.

14. Pattern data processing apparatus according to claim 11, wherein the memory means stores data for reference patterns and unit patterns of size data and compressed stitch data.

15. A process of producing composite pattern data with a sewing machine, comprising the steps of
    selecting a reference pattern and a plurality of unit patterns;
    storing data corresponding to the selected reference pattern, the selected unit patterns, and an allowable maximum number of unit patterns for the reference pattern;
    comparing the selected number of plurality of unit patterns to the allowable maximum number of unit patterns for the selected reference pattern;
    setting a reference position for the selected reference pattern;
    positioning reference positions for the selected unit patterns with respect to the reference position from the selected reference pattern; and
    composing composite pattern data from the selected reference pattern and the selected unit patterns using the calculated reference positions of the reference pattern and unit patterns.

16. The process of producing composite pattern data in accordance with claim 15, wherein the step of comparing the selected number of unit patterns includes the step of signaling an error signal when the selected number of unit patterns exceeds the allowable maximum number of unit patterns for the selected reference pattern.

17. The process of producing composite pattern data in accordance with claim 15, wherein the step of composing composite pattern data comprises the step of calculating a shift amount for the formation of successive unit patterns with respect to the selected reference pattern.

18. The process of producing composite pattern data in accordance with claim 17, wherein the step of calculating the shift amount includes the step of using size data for an outer profile of the selected plurality of unit patterns and the reference positions of the selected unit patterns.

19. The process of producing composite pattern data in accordance with claim 15, further comprising the step of forming a composite pattern on a workpiece based on the composite pattern data.

* * * * *